United States Patent
Kusano et al.

[11] Patent Number: 6,077,369
[45] Date of Patent: Jun. 20, 2000

[54] METHOD OF STRAIGHTENING WIRE RODS OF TITANIUM AND TITANIUM ALLOY

[75] Inventors: Akihiko Kusano, Tokyo; Kinichi Kimura, Hikari; Noboru Takeuchi, Hikari; Isamu Takayama, Hikari; Tatsuo Yamazaki, Hikari; Haruo Ohguro, Hikari; Yutaka Sadano, Hikari; Satoshi Yamamoto, Hikari, all of Japan

[73] Assignee: Nippon Steel Corporation, Tokyo, Japan

[21] Appl. No.: 08/817,804

[22] PCT Filed: Sep. 20, 1995

[86] PCT No.: PCT/JP95/01897

§ 371 Date: Mar. 19, 1997

§ 102(e) Date: Mar. 19, 1997

[30] Foreign Application Priority Data

Sep. 20, 1994 [JP] Japan .................... 6-225244

[51] Int. Cl.⁷ ................ C22F 1/18; B21D 3/12
[52] U.S. Cl. ............ 148/568; 148/645; 148/646; 148/670
[58] Field of Search .................. 148/566, 568, 148/645, 646, 669, 670

[56] References Cited

FOREIGN PATENT DOCUMENTS

| | | |
|---|---|---|
| 52-44311 | 11/1977 | Japan . |
| 53-42033 | 11/1978 | Japan . |
| 58-157935 | 9/1983 | Japan . |
| 60-038744 | 9/1985 | Japan . |
| 62-220220 | 9/1987 | Japan . |
| 1-273636 | 11/1989 | Japan . |
| 2-187216 | 7/1990 | Japan . |
| 6-79743 | 10/1994 | Japan . |

*Primary Examiner*—Sikyin Ip
*Attorney, Agent, or Firm*—Pillsbury Madison & Sutro LLP

[57] ABSTRACT

A method of straightening a wire rod of titanium or titanium alloy wherein the rod is hot-straightened to a straight rod at the straightening temperature T and elongation $\epsilon$ satisfying the expression (1) or (2). The method includes hot rolling a titanium billet of $\beta$ titanium alloy, ($\alpha+\beta$) titanium alloy or a near $\alpha$ titanium alloy into a wire rod, winding the hot rolled wire rod into a coil, cold drawing the wire rod, cutting the wire rod to obtain a bent wire rod, heating the bent wire rod to a straightening temperature T while both end portions of the bent wire rod are fixed, applying a predetermined elongation $\epsilon$ to the wire rod, maintaining a straightening temperature T, hot-straightening the wire in accordance with the expression (2)

$$\epsilon(T-400) \geq 400 \quad (1)$$

$$\epsilon(T-500) \geq 200 \quad (2)$$

and cooling the wire rod while applying tension. The method is suitable for preparing a straight rod for use in an engine valve.

4 Claims, 8 Drawing Sheets

METHOD OF STRAIGHTENING WIRE RODS OF TITANIUM AND TITANIUM ALLOY

This application is the national phase of international application PCT/JP95/01897, filed Sep. 20, 1995 which designated the U.S.

TECHNICAL FIELD

The present invention relates to a method of straightening bent wire rods of titanium and titanium alloy into the precisely straight rod products. More particularly, the present invention relates to a method of straightening titanium alloy wire rods appropriate for materials applied for engine valves.

BACKGROUND ART

Titanium and titanium alloy rod products are widely used for automobile parts such as engine valves and tools, because the specific strength and corrosion resistance of titanium and titanium alloy is excellent.

Because centerless grinding finish is required for such use of automobile parts materials, it is necessary to straighten the wire rod product to straightness less than 1 mm/m, i.e., the level of which centerless grinding can be conducted.

Since Young's modulus of titanium or titanium alloy is approximately a half of that of carbon steel or stainless steel, it is necessary to give a twice strain to straighten titanium and titanium alloys, comparing with carbon steel or stainless steel.

Therefore, when a wire rod made of titanium or titanium alloy is straightened at room temperature by using a conventional type of straightening apparatus used in the steel industry, the bend of the wire rod tends to remain. When a large amount of strain is given to the wire rod so as to remove the bend from it, cracks and flaws are likely to occur.

For example, a stainless steel wire rod is commonly straightened as follows. After the wire rod has been rolled, it is subjected to cold drawing and shaving in which the surface of the wire rod is shaved by an inverse die. After the surface of the wire rod has been finished, it is formed into a coil-shaped wire rod. Next, the wire rod is straightened by using a rotary housing type wire straightener and cut into a straight rod product.

When a wire rod made of titanium or titanium alloy is straightened by using the method described above, the following problems may be encountered. In order to straighten the wire rod of titanium or titanium alloy into a precise straight rod that can be subjected to centerless grinding, the straightening work of the wire rod of titanium or titanium alloy must be conducted at a higher accuracy than that of a stainless steel wire rod. Even if straightening work is conducted with high accuracy, problems of bend, cracks and flaws occur. As a result, the yield of the products becomes poor to cause the production cost higher.

Concerning a method of suppressing the occurrence of bends, cracks and flaws so as to enhance the yield of the products, the following methods have been disclosed. With respect to a deformed cross-section shape made of titanium alloy or super alloy, tensile straightening method in a movable radiation furnace is disclosed in Japanese Unexamined Patent Publication No. 2-187216. With respect to a sheet foil made of tungsten or molybdenum, tensile straightening method in a movable radiation furnace is disclosed in Japanese Unexamined Patent Publication No. 62-220220.

Most of straight rods of titanium or titanium alloy, which have been straightened, must be subjected to centerless grinding so that the surfaces of the rods can be finished. Therefore, the size, the amount of bend and scale thickness on the surfaces of the rods must satisfy small tolerances compared with that of shape steel and others.

Therefore, when the tensile straightening method mentioned above is applied to the straightening work in which a wire rod is straightened so as to make a straight rod, the wire rod is partially heated. As a result, it is difficult to provide a uniform contract of cross section in the longitudinal direction of the wire rod. Accordingly, the accuracy of the size in the longitudinal direction is lowered in one wire rod, and the ratio of defect rod increases in the straightening process.

Further, according to the above methods, only a predetermined tension is given to the wire rod, but an elongation caused by straightening is not stipulated. Accordingly, fluctuation of the target size increases according to the initial size of the rod, the distribution of temperature in the furnace and the fluctuation of the moving speed in the furnace. Therefore, it is difficult to conduct above method for a centerless grinding finished wire rod, or alternatively the number of centerless grinding operations increases. As a result, the productivity is deteriorated and the yield is lowered.

In addition to the above disadvantages, radiation heating causes surface oxidized scale which grows easily by oxidation. In order to take measures to solve the above problems, Japanese Unexamined Patent Publication No. 62-220220 discloses a method for coating to protect surface formed oxidation or a method for blowing inert gas into the furnace so as to lower the concentration of oxygen. However, because the affinity of titanium or titanium alloy with oxygen is strong, a surface coating to prevent oxidation shows little effective. Further a method for blowing inert gas is not economical, and the apparatus is complicated. As a result, the production cost is raised.

The object of the present invention is to produce straight rods of titanium or titanium alloy at a low cost by enhancing the yield of the product by means of hot-straightening methods under a specific straightening condition in order to reduce cracks and flaws and to stabilize the dimensional accuracy.

The other object of the present invention is to produce straightened titanium alloy rods suitably for automobile parts materials such as engine valves by applying hot-straightening method under a specific straightening condition.

CONSTRUCTION OF THE INVENTION

In order to accomplish the above objects, the present invention is to provide a method of straightening titanium and titanium alloy wire rods under the following conditions.

In the case where the chemical component of the wire rods is titanium, straightening is carried out under the condition that the straightening temperature T and the straightening elongation c satisfy the expression (1).

$$\epsilon(T-400) \geq 100 \tag{1}$$

In the case where the chemical component of the wire rods is titanium alloy, straightening is carried out under the condition that the straightening temperature T and the straightening elongation $\epsilon$ satisfy the expression (2).

$$\epsilon(T-500) \geq 200 \tag{2}$$

When wire rods are straightened in the hot-straightening process which satisfies the above conditions, it is possible to stably reduce an amount of bend of straight rods to a value of not more than 1 mm/m.

Further, according to the present invention, straight rods of titanium alloy suitable for use for engine valves are produced when (α+β) type or near α type titanium alloy is used and the straightening temperature is raised to a value not less than 700° C. after the structure has been conditioned to a needle-shaped structure and hot-straightening is conducted on the wire rods in accordance with the above expression (2). When the thus produced straight rod of titanium alloy is formed into an engine valve, the shaft portion of the engine valve keeps straight in the annealing process conducted after the valve umbrella portion has been forged.

In this connection, titanium described in the method of the present invention is pure titanium. Concerning titanium alloy, examples of usable β type titanium alloy are: Ti-3Al-8V-6Cr-4Mo-4Zr, and Ti-15V-3Cr-3Sn-3Al. Examples of usable (α+β) type titanium alloy are: Ti-6A1-4V, Ti-3Al-2.5V, Ti-6Al-2Fe-0.1Si, Ti-5Al-1Fe, Ti-5Al-2Cr-1Fe, and Ti-6Al-2Sn-4Zr-6Mo. Examples of usable α type titanium alloy are: Ti-5Al-2.5Sn, and Ti-6Al-2Sn-4Zr-2Mo. An example of near α type titanium alloy is: Ti-6Al-2Sn-4Zr-2Mo-0.1Si.

BEST MODE FOR CARRYING OUT THE INVENTION

The best mode for carrying out the invention will be explained as follows.

The present invention is to provide a tensile-straightening method in which a bent wire rod of titanium or titanium alloy, which is formed by cutting a coil-shaped wire rod to a predetermined length, is straightened to obtain a straight rod by giving a tension to it at a high temperature, wherein the straightening temperature T and the straightening elongation ε are stipulated in the method so as to obtain a predetermined amount of bend.

The coil-shaped wire rod used in the method of the present invention is made in such a manner that a billet is hot-rolled into a wire rod and wound into a coil-shape, and the coiled wire rod is subjected to cold-drawing and shaving to obtain the finished surface and enhanced circulating of cross section. Also, the coiled wire rod used in the method of the present invention is a coil-shaped drawn wire rod obtained from cold-drawing. This wire rod is referred to as a coil-shaped wire rod in this specification, hereinafter.

Figure 1:
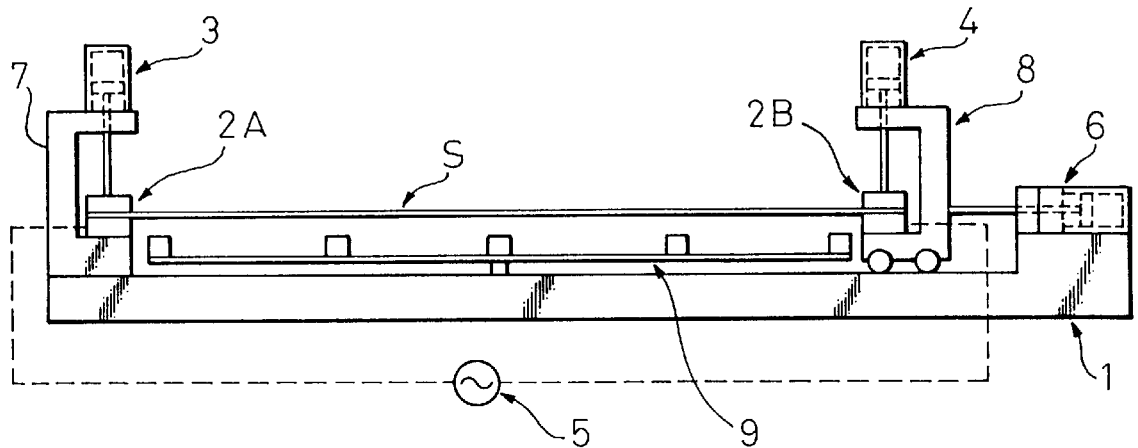
FIG. 1 is a front view showing an overall arrangement of the typical apparatus used for the straightening method of the present invention.
Figure 2:
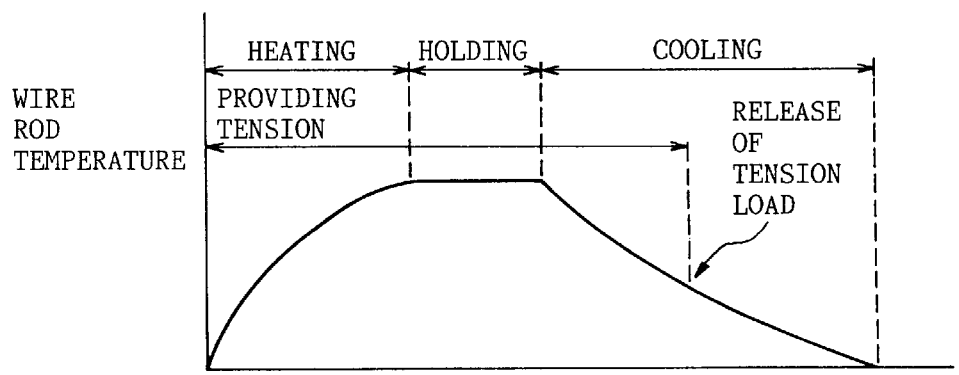
FIG. 2 is a view showing a typical heat pattern in the straightening process of the method of the present invention.
Figure 3:
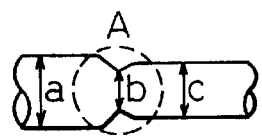
FIG. 3 is a view showing a necking of a wire rod.

An example of the wire rod straightening apparatus is shown in FIG. 1. A typical example of the wire rod straightening heat pattern is shown in FIG. 2. A definition of necking of a straight rod after the completion of straightening is shown in FIG. 3.

The hot straightening apparatus is composed of a material holding device, a heating device and a tensile loading device.

The heating device is composed of a direct electrical heating device so that the heating device can be used as both the material holding device and the heating device.

In this case, it is preferable to use the direct electrical heating device from the viewpoint of preventing oxidation caused during heating and also from the viewpoint of enhancing the efficiency, however, it should be noted that the heating method is not limited to the above specific method, but it is possible to use an induction heating method or an atmosphere heating method.

Referring to FIG. 1, the straightening apparatus will be specifically explained below.

On the frame 1, there are provided a stationary stand 7 and a movable carriage 8. On the stationary stand 7, there is provided a heating and holding device 2A connected with a clamp cylinder 3 so that the heating and holding device 2A can be moved upward and downward. On the movable carriage 8, there is provided a heating and holding device 2B connected with a clamp cylinder 4 used for a movable clamp so that the heating and holding device 2B can be moved upward and downward.

Also, on the frame 1, there is provided a pulling cylinder 6 to pull the movable carriage 8. The heating and holding devices 2A and 2B are electrically connected to each other via an electric power source 5.

Also, on the frame 1, there is provided a support device 9 to support a wire rod S to be cooled under the condition that no load is given to the wire rod.

The wire rod S, which is obtained when a coiled wire rod is cut by a predetermined length, is set in the above apparatus as follows. Both end portions of the wire rod S are set in the heating and holding device 2 and fixed to the straightening apparatus by the cylinder 3 used for the stationary clamp and the cylinder 4 used for the movable clamp. In this case, when the coiled wire rod is roughly straightened beforehand, it can be easily set in the holding device. However, when the coiled wire rod is roughly straightened, an amount of strain given to the wire rod in the rough straightening should be preferably not more than 20 mm/m to prevent the occurrence of cracks in the rough straightening process.

Next, heating of the wire rod S is started by turning on the electric power source 5. In this heating operation, the heating and holding devices 2A and 2B are used as electrodes. Then, the pulling cylinder 6 is operated, so that the wire rod is pulled by the movable carriage 8.

Temperature of the wire rod is measured by a radiation thermometer or a thermocouple.

After the wire rod has been heated to the straightening temperature T while tension is being given to the wire rod, the temperature is kept for a predetermined period of time. When the elongation percentage of the wire rod has reached a predetermined value, the heating operation is stopped, and the wire rod is cooled. Even in the process of cooling, tension load is continuously given to the wire rod.

In this connection, the above elongation percentage of the wire rod is found when the straightening elongation $\epsilon$ (elongation at the room temperature) is converted by a coefficient of thermal expansion.

That is, a relation between the elongation percentage ($\epsilon'$) in the heating process and the elongation ($\epsilon$) after the completion of cooling can be expressed by the following equation, $$\epsilon = \epsilon' - 100\lambda\Delta T$$

where $\lambda$ is a coefficient of linear expansion, T is a straightening temperature, and $\Delta T$ (° C.) is a temperature difference after cooling. In this connection, the coefficient of linear expansion $\lambda$ is $9.0\times10^{-6}$ in the case of titanium.

During of cooling, because the wire rod is contracted, a tensile force given to the wire rod is increased. When the force given to the wire rod is increased to a value higher than a tension which is previously given to the wire rod, the movable carriage 8 is moved toward the stationary stand 7 while the tension is given to the wire rod, so that the wire rod can be straightened.

After the temperature of the wire rod has reached a temperature at which tension load is removed, the pulling cylinder 6, the cylinder 3 for the stationary cramp and the cylinder 4 for the movable cramp are released, and the wire rod is cooled to the room temperature.

In order to prevent the wire rod from bending in the process of cooling, it is preferable to support several points of the wire rod in the longitudinal direction by the support device 9 by which the wire rod can be maintained straightly.

When the straightening temperature T is too low, the residual stress and the residual strain of the wire rod are not sufficiently released. Therefore, the bend of the wire rod tends to remain. Further, there is a possibility of the occurrence of cracks and flaws. The inventors made investigation into the minimum value of the straightening temperature T when an amount of bend was not more than 1 mm/m which is a condition required for centerless grinding. As a result of the investigation, the inventors found that the minimum temperature was 410° C. in the case of titanium and 520° C. in the case of titanium alloy.

Since the mechanical strength of titanium alloy is higher than that of titanium, its minimum straightening temperature is high.

When the straightening temperature is too high, the thickness of scale generated by oxidation is increased. Therefore, the cost of removing scale is raised.

When the wire rod is subjected to centerless grinding, an amount of grinding per one grinding operation is approximately 0.05 mm. The inventors investigated straightening temperature at which straightening of the wire rod can be completed in one grinding operation. As a result, when the straightening temperature T of titanium was in a range from 410° C. to 1000° C., grinding was completed in one operation. However, from the economical viewpoint, it is preferable that the straightening temperature T is in a range from 410° C. to 900° C.

In the same manner, when the straightening temperature T of titanium alloy was in a range from 520° C. to 1100° C., grinding was completed in one operation. However, from the economical viewpoint, it is preferable that the straightening temperature T is in a range from 520° C. to 1000° C.

Since the oxidation resistance of titanium alloy is higher than that of titanium, the maximum straightening temperature of titanium alloy is higher than that of pure titanium.

The straightening elongation $\epsilon$ was found in such a manner that a difference of length of the wire rod before and after straightening was measured and the thus measured difference of the wire rod was divided by the length before straightening. When the straightening elongation $\epsilon$ is too small, the bend of the wire rod can not be straightened completely. Therefore, it is preferable that the straightening elongation $\epsilon$ is not less than 0.5%.

When the straightening elongation $\epsilon$ is large, the necking of the wire rod illustrated in FIG. 3 is remarkably increased, and further the size of outside diameter tends to deviate from a target value. In this case, the necking portion is a portion of the wire rod, the diameter of which is locally smaller than that of other portion. An amount of necking is defined by a higher value between (a–b) and (c–b) shown in FIG. 3.

When the diameter of the necking portion is smaller than that of other portion by a value not less than 0.05 mm, it is difficult to remove oxidation scale on the surface of the wire rod by one centerless grinding operation in which an amount of grinding is 0.05 mm.

According to the result of investigation made by the inventors, when the straightening elongation $\epsilon$ of titanium was not more than 10% and the straightening elongation $\epsilon$ of titanium alloy was not more than 8%, the necking was not remarkably increased. Since the ductility of titanium alloy is lower than that of titanium, the maximum straightening elongation of titanium alloy is smaller than that of titanium.

Further, the present inventors found as followings. In the case of titanium, when the straightening temperature T and the straightening elongation $\epsilon$ satisfy the expression of $\epsilon(T-400) \geqq 100$, an amount of bend of the straight rod can be stably maintained at a value not more than 1 mm/m. Also, in the case of titanium alloy, when the straightening temperature T and the straightening elongation $\epsilon$ satisfy the expression of $\epsilon(T-500) \geqq 200$, an amount of bend of the straight rod can be stably maintained at a value not more than 1 mm/m.

There are shown operating conditions except for the straightening temperature T and the straightening elongation $\epsilon$.

The tension load of which is 1.1 to 1.8 times as high as the yield stress of the wire rod at the heat holding temperature, is given to the wire rod.

The pulling speed of the wire rod during heating is determined to be a value at which the wire rod is not loosened by the influence of thermal expansion.

When the temperature at which tension load is removed during cooling is too high, the bend of the wire rod is increased, and the wire rod becomes defective.

The inventors investigated the maximum temperature at which tension load was removed so that an amount of bend could be not more than 1 mm/m. As a result of the investigation, the preferable temperature range was not higher than 300° C. in both cases of titanium and titanium alloy.

Concerning the cooling method, it is common that the air cooling method is adopted from the viewpoint of preventing the bend of the wire rod caused by heat deviation. However, it is possible to adopt a uniform cooling method, for example, a cooling method using blown air at high speed may be adopted, or alternatively a cooling method using a water shower may be adopted so as to shorten the cooling time.

A method of measuring the bend of the straight rod is described as follows. The straight rod was supported and turned at a room temperature. Then the deviation at the center of the straight rod was measured, so that the maximum and the minimum of deviation were found, and then a half of the difference between the maximum and the minimum was found. The measurement was made at two positions with respect to 1 m of the straight rod. The maximum of the bend was defined as an amount of bend.

When the amount of bend of the straight rod was not less than 1.1 mm/m, it was difficult to conduct centerless grinding on the straight rod. Therefore, a latitude of the amount of bend was determined to be not more than 1.0 mm/m.

As a result of the investigation, the most appropriate straightening range of titanium and titanium alloy can be expressed by the straightening temperature T and the straightening elongation $\epsilon$. That is, the most appropriate straightening range of titanium and titanium alloy can be expressed by the following expressions (1) and (2).

(1) In the case of a titanium wire rod $$\epsilon(T-400) \geq 100 \qquad (1)$$

T: straightening temperature (° C.)
$\epsilon$: straightening elongation (%)

(2) In the case of a titanium alloy wire rod $$\epsilon(T-500) \geq 200 \qquad (2)$$

T: straightening temperature (° C.)
$\epsilon$: straightening elongation (%)

Next, an explanation will be made when the straightening method of the present invention is applied to a case in which titanium alloy straight rods are produced so that they can be used for producing engine valves to be incorporated into an automobile engine or a two-wheeled vehicle engine.

Figure 10A:
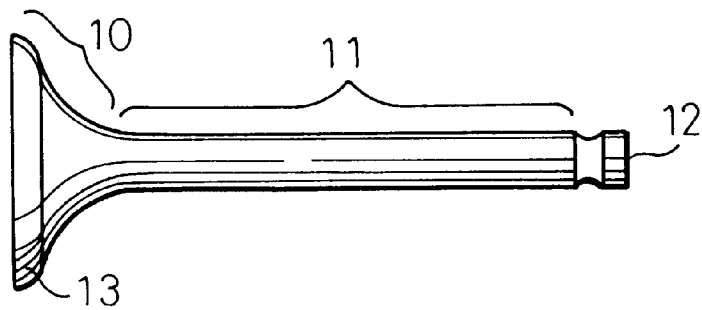
FIG. 10(A) is a side view of an engine valve.
Figure 10B:
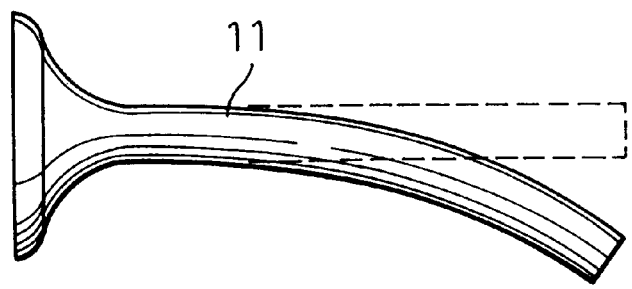
FIG. 10(B) is a view showing a state of an engine valve in the manufacturing process, the shaft portion of which is deformed.

As illustrated in FIG. 10(A), a valve used for a suction port or an exhaust port of an engine for automobile use includes: an umbrella portion 10; a shaft portion 11 formed continuously to the umbrella portion; and a shaft end portion 12. For example, the above valve is produced as follows. A steel rod, the diameter of which is 7 mm, is cut to the length of 250 mm. While one end portion of the steel rod is heated by an electrical heating means, it is subjected to upset forging which is an electric forging method. Then the umbrella portion 10 is formed by forging at high temperature using a die, so that a mushroom-shaped material can be formed as illustrated in FIG. 10(B). Next, stress relief annealing is conducted. After that, the material is subjected to machining and grinding, so that it can be formed into a final shape. Then, in order to enhance the abrasion resistance, the thus produced valve is subjected to surface treatment such as soft nitriding processing.

It is necessary that the abrasion resistance is high in the face portion 13 of the umbrella portion 10, the shaft portion 11 and the shaft end portion 12. In view of the environment in which the engine valve is used, it is necessary that the mechanical strength of the engine valve is high at high temperatures, and it is also necessary that the corrosion resistance and the oxidation resistance of the engine valve are high. Therefore, in general, engine valves of the prior art are made of heat-resisting steel.

Recently, concerning an automobile engine, there is a demand for reducing the weight of the automobile engine for the purpose of improving the fuel consumption without deteriorating its output. Since the engine valve is repeatedly moved upward and downward at high speed in its operation, it is possible to provide a great effect when an improvement of fuel consumption can be attained by reducing the weight of the engine valve. Therefore, in order to reduce the weight, it is attempted to use titanium alloy, the specific strength of which is high, for making the engine valve. For example, Ti-6Al-4V, which is a typical ($\alpha+\beta$) titanium alloy, is frequently used for the suction valves of a racing car.

However, when titanium alloy is used for the engine valve as it is, when each portion of the engine valve slides on the valve seat and the valve guide, the engine valve is worn away by the sliding motion. For this reason, the durability of the engine valve made of titanium alloy is low. Therefore, when the engine valve is made of titanium alloy, it is machined and finished by the substantially same method as that of the valve made of heat-resisting steel. After that, in order to give the abrasion resistance to the shaft portion of the engine valve, flame coating of molybdenum is conducted on the shaft portion of the engine valve. Accordingly, the production cost is raised. As described above, the conventional method is not economical.

On the other hand, Japanese Unexamined Patent Publication No. 61-81505 and No. 62-256956 disclose an oxidation processing method and a nitriding processing method, in which heating is respectively conducted in an oxidizing atmosphere and a nitriding atmosphere, which is an abrasion-resisting processing method to be performed at low cost. However, when the above processing is applied to a common ($\alpha+\beta$) type titanium alloy engine valve, since the engine valve is heated to a high temperature in the processing, a thermal deformation is caused in the valve, that is, the shaft portion is bent. Therefore, it is impossible to ensure a dimensional accuracy required for the engine valve. Accordingly, it is necessary to straighten the engine valve made of titanium alloy, the surface of which has been treated. Therefore, it is very difficult to accomplish an effective production of the engine valve. The above method is described on page 74 of No.2 of vol.35 of "Titanium and Zirconium".

The reason why the size of the valve is changed in the heat processing is described below. Since a common ($\alpha+\beta$) type titanium alloy straight rod is of a fine equi-axed $\alpha$ crystal structure, when it is heated to a processing temperature of 700 to 900° C. in the processes of oxidation and nitriding, a creep deformation is caused in the valve by a stress of low intensity generated by the weight (about 50 g) of the titanium alloy valve itself. In order to solve the above problem of deformation caused by creep, as disclosed in Japanese Unexamined Patent Publication No. 5-59919, a straight rod made of ($\alpha+\beta$) type titanium alloy of specific structure (for example, needle-shaped a crystal structure) or near $\alpha$ type titanium alloy may be used as material to make the valve. In this connection, a straight rod, the diameter of which is 5 to 10 mm, of the fine equi-axed a crystal structure is commonly produced in such a manner that a billet is hot-rolled into a coil-shaped wire rod, and the wire rod is subjected to cold-drawing to make the accurate circularity cross section thereof, and then shaving is conducted to remove flaws from the surface, and then the wire rod is cut and straightened. However, there is provided no specific proposition about the producing method of a straight wire rod of the needle-shaped a crystal structure, the values of elongation and drawing of which are lowered.

Commonly, stress relief annealing is conducted after forging of the umbrella portion. In the process of stress relief annealing, when titanium alloy is used, even in the case of a straight rod having a specific structure in which no creep deformation is caused, the shaft portion is bent by up to 100 μm. In the case where a straight rod is made of heat-resisting steel, the shaft portion is by up to about 50 μm in the process of annealing. Since this deformation can be easily removed by grinding, no problems are caused in the production of the engine valve. However, in the case of titanium alloy, the shaft portion is greatly deformed, so that the umbrella portion deviates greatly from a predetermined position. Accordingly, it is necessary to machine both the shaft portion and the umbrella portion so that the deformed portions can be removed. In this case, it is more difficult to machine titanium alloy than heat-resisting steel. Further, the material cost of titanium alloy is higher than that of heat-resisting steel. Therefore, it is not advantageous to adopt the above method of removing the deformed portions by means of cutting and grinding.

The present invention is to provide a hot-straightening method to be used for producing a titanium alloy valve. According to the present invention, a method of producing a titanium alloy straight rod is improved, and an amount of bend of the shaft portion of the valve caused in the process of stress relief annealing is reduced, so that an amount of cutting and grinding can be reduced. In this case, stress relief annealing is necessary for preventing the deformation of the valve which has been finished by means of oxidation processing or nitriding processing.

In order to prevent the deformation caused in the process of stress relief annealing, it is essential to produce a straight rod, the structure of which is difficult to be deformed by creep. However, when the needle-shaped a crystal structure, which is hardly deformed by creep, is formed in the hot-rolling process, the values of elongation and drawing are lowered. Accordingly, there is a tendency that cracks are caused when a coil-shaped wire rod is straightened to a straight rod. In order to solve the above problems, it is necessary to improve the straightening method.

However, when the fine equi-axed a crystal structure, which is easily deformed by creep, is formed in the hot-rolling process, this structure must be changed into a structure, which is hardly deformed by creep, by heat treatment. In the above heat treatment process, the wire rod is greatly deformed, so that it becomes difficult to straighten the wire rod. In order to solve the above problems, it is necessary to improve the straightening method.

In order to solve the above problems, the present invention adopts the following method.

When the titanium alloy is an (α+β) type titanium alloy or a near α type titanium alloy and also when the structure of a coil-shaped wire rod is formed into a needle-shaped α crystal structure in the hot-rolling process, after the coil-shaped wire rod is roughly straightened or when the coil-shaped wire rod is not roughly straightened, the wire rod is straightened while the straightening temperature T in the expression (2) is raised to a value not lower than 700° C.

When the titanium alloy is an (α+β) type titanium alloy or a near a type titanium alloy and also when the structure of a coil-shaped wire rod is formed into a fine equi-axed a crystal structure in the hot-rolling process, after the coil-shaped wire rod is roughly straightened or when the coil-shaped wire rod is not roughly straightened, the wire rod is heated to a temperature range from a temperature of (β transformation point−50° C.) to a temperature of (β transformation point+100° C.), so that the structure is formed in such a manner that the equi-axed α crystals are dispersed in the needle-shaped α crystal structure, or the structure is formed into the needle-shaped α crystal structure, and then the wire rod is straightened while the straightening temperature T in the expression (2) is raised to a value not lower than 700° C.

It is possible to hot roll the above (α+β) type titanium alloy or the near a type titanium alloy described above so as to produce a wire rod, the diameter of which is 5 to 10 mm. Characteristics of the (α+β) type titanium alloy and the near a type titanium alloy described above are appropriate for the engine valve. When these titanium alloys are hot-rolled in a temperature range of β phase or when these titanium alloys are simply heated in this temperature range, the structure becomes a needle-shaped α crystal structure. When these titanium alloys are sufficiently hot-rolled in a temperature range of (α+β) phase, the structure becomes a fine equi-axed a crystal structure.

When the microstructures of the coil-shaped wire rods made of the above alloys are hardly deformed by creep, that is, when the microstructures of the coil-shaped wire rods made of the above alloys are the needle-shaped α crystal structure, straightening is carried out by the following method.

First, the coil is roughly straightened by a continuous drawing and straightening processor, or alternatively, the coil is cut by a predetermined length as it is, and then the wire rod is roughly straightened without causing cracks in the wire rod. A value of the mechanical property of the wire rod of the needle-shaped structure is approximately a half of that of the mechanical property of the wire rod of the fine equi-axed a crystal structure. That is, the value of elongation is 7%, and the value of drawing is 20%. Accordingly, when a common straightening method is adopted in which the wire rod is straightened by rollers arranged in a zigzag manner, and when the wire rod is completely straightened by the above rollers, cracks are caused in the needle-shaped a crystal structure. In order to prevent the occurrence of cracks, straightening is carried out roughly, that is, an amount of bend of the wire rod after straightening is maintained to be approximately 20 mm/m in the roughly straightening process. In this connection, the wire rod may be roughly straightened using the hot-straightening apparatus illustrated in FIG. 1.

Then the wire rod is straightened at high temperature by the above hot-straightening apparatus according to the condition expressed by the expression (2). The reason why straightening is conducted at high temperature is described below. When the wire rod is straightened at a room temperature in the same manner as that of a conventional straightening method, a stress generated in the cold bending process is released in the annealing process which is conducted after the umbrella portion of a valve has been forged. Therefore a deformation is caused in the valve. That is, the commonly used wire rod, the diameter of which is 5 to 10 mm, is produced as follows. A billet is hot-rolled, so that a coil-shaped wire rod is provided, wherein the diameter of the coil is 1 to 2 m. Then the coil-shaped wire rod is drawn at a room temperature and subjected to shaving so as to finish the surface of the wire rod and make the enhanced circularity of cross section. After that, the coil is processed by a continuous drawing and straightening processor and cut to an appropriate length. Then the wire rod is straightened to be a straight rod by two rollers at a room temperature. Next, the straight wire rod is subjected to centerless grinding and finally finished. In the above cold straightening process including the process of cold drawing, a large strain is accumulated in the wire rod. This strain is released when the wire rod is subjected to heat treatment in the later process. Therefore, the shape of the wire rod returns to the somewhat initial shape.

There is shown an example in which the shape of a straight rod is affected by the strain caused by cold working during heat treatment. In the case of Ti-6Al-4V alloy, after the bend of 2.5 mm per 10 cm had been straightened, the wire rod was annealed at 800° C. After the completion of annealing, a bend of 100 μm was generated, and the rate of generation was approximately 4%. On the other hand, in the case of heat-resisting steel SUH11 used for a valve, after the bend had been straightened in the same manner as that described above, the wire rod was annealed at 800° C. After the completion of annealing, only a bend of 50 μm was generated, and the rate of generation was only about 2%. According to the above example, it can be understood that the bend of the titanium alloy rod was large and the rate of generation was high.

According to the present invention, the above problems can be solved by conducting a specific hot-straightening operation. In this case, the straightening temperature T is determined to be not lower than 700° C.

The reason why the straightening temperature T is determined to be not lower than 700° C. is described as follows. When a straight rod is straightened at a temperature lower than 700° C., the shaft portion is bent in the annealing process conducted after forging the umbrella portion. In this case, it is possible to conduct annealing at a temperature lower than 700° C. so that the bend of the shaft portion is prevented. However, in this case, the temperature of abrasion resistance processing is also restricted to a temperature lower than 700° C. As a result, even when oxidation processing is conducted, the processing temperature of which is lower than that of nitriding processing, it is impossible to provide a hardened layer by the processing conducted at a temperature lower than 700° C. In this case, the antiabrasion resistance in the face portion is not sufficient.

In this case, an upper limit of the temperature of hot-straightening is not specifically determined. However, when the temperature is too high, the proof stress is lowered, so that the wire rod hangs by the action of gravity. Therefore, even when tension is given to both end portions, the bent wire rod cannot be sufficiently straightened. When consideration is given to the above matter and also when consideration is given to the temperature at which the shaft portion is not bent in the annealing process conducted after forging the umbrella portion, it is preferable that the upper limit of the straightening temperature T is 1000° C. In this connection, when the heating time is short, it is necessary to raise the temperature a little. Cooling may be conducted by means of air cooling.

According to the expression (2) described before, the straightening elongation ε is not less than 1%. However, according to the result of the experiment, when hot-straightening is conducted, it is most appropriate that the straightening elongation ε is in a range from 1 to 8%.

When the structure of titanium alloy used for a valve is a fine equi-axed α crystal structure, the grain size of which is 2 to 4 μm, in which the coil-shaped wire rod tends to be deformed by creep, straightening is carried out by the following method.

First, a coil-shaped wire rod is roughly straightened by a continuous drawing and straightening processor and cut to an appropriate length. After that, when necessary, the wire rod is roughly straightened by common straightening rollers arranged in a zigzag manner. In this connection, concerning the mechanical property of this wire rod, the value of elongation is 15%, and the value of drawing is 40%, which are sufficiently high for straightening. Therefore, no clacks are caused even when straightening is completely conducted. Next, before the wire rod is held and straightened at high temperature by the heating and holding device in the above hot-straightening apparatus, the wire rod is previously heated as follows. After the wire rod has been heated to a temperature range from (β transformation point−50° C.) to (β transformation point), it is cooled to the straightening temperature by means of air cooling, so that the structure of the wire rod is changed into a structure in which the equi-axed α crystals are dispersed in the needle-shaped α crystal structure. Alternatively, after the wire rod has been heated to a temperature range from (β transformation point) to (β transformation point+100° C.), it is cooled to the straightening temperature by means of air cooling, so that the structure is changed into the needle-shaped α crystal structure. The reason why the structure is changed as described above is to prevent the wire rod from being deformed by creep in the process of annealing conducted after forging the umbrella portion and also to prevent the wire rod from being deformed by creep in the process of abrasion resistance processing. The reason why a common heat treatment furnace is not used to change the structure of the wire rod is described as follows. When the coil-shaped wire rod of the fine equi-axed α crystal structure, which tends to be deformed by creep, is processed in the heating treatment furnace, the wire rod is greatly deformed, and it becomes difficult to straighten the wire rod in the later process. Of course, after the completion of heat treatment to control the structure, the wire rod may be cooled to a room temperature by air cooling, and then the temperature of the wire rod may be raised to a predetermined value to conduct straightening.

The reason why the wire rod is heated to a temperature not lower than (β transformation point−50° C.) is described as follows. When the temperature is lower than that, the fine equi-axed α crystal structure is seldom changed to the needle-shaped α crystal structure. Therefore, the deformation caused by creep can not be sufficiently prevented. The reason why the wire rod is heated to a temperature not higher than (β transformation point+100° C.) is described as follows. When the temperature exceeds the above (β transformation point +100° C.), the deformation caused by creep can be sufficiently prevented, however, the wire rod is intensely oxidized. Therefore, an amount of grinding of the wire rod is increased in the successive centerless grinding process.

In this connection, the heating time necessary for conditioning the structure is several minutes to 30 minutes when the temperature is not higher than β transformation point. The heating time necessary for conditioning the structure is several seconds to 1 minute when the temperature is not lower than β transformation point.

After the structure has been changed as described above, the wire rod is hot-straightened under the condition of the above expression (2) at a temperature of 700 to 1000° C. In this case, it is preferable that the straightening elongation ε is maintained in a range from 1 to 8%.

EXAMPLES

Example 1

In this example, wire rods made of the second type pure titanium (Second Type Titanium Rods of JIS.H4650 which are most commonly used) were straightened under the following conditions.

First, a billet was heated to a temperature of 840° C. and rolled at a finishing temperature of 740° C. The billet was rolled to a wire rod, the diameter of which was 7 mm. Thus rolled wire rod was wound and formed into a coil-shaped wire rod, wherein the diameter of the coil was 1.4 m.

This coil-shaped wire rod was subjected to cold drawing and shaving so as to finish the surface of the wire rod and at the same time the section of the wire rod was finished to an accurate circularity, the diameter of which was 5.5 mm.

The thus finished coil-shaped wire rod was cut to the length of 2.2 m and straightened in the atmosphere by a direct electrical heating type straightener shown in FIG. 1.

Temperature of the wire rod was measured by a thermocouple, and the wire rod was cooled by air cooling.

The straightening temperature T was changed in a range from 350° C. to 700° C. and also in a range from 800° C. to 1000° C. at intervals of 50° C., that is, the straightening temperature T was changed in 13 stages. The straightening elongation ϵ was changed in 7 stages of 0.5, 1, 2, 4, 7, 10 and 11%. The temperature at which tension load was removed was changed in 6 stages of 100, 200, 250, 300, 350 and 400° C. Under the above conditions, the wire rods were straightened, and straight rods, the length of which was 2200 mm, were provided.

Figure 4:
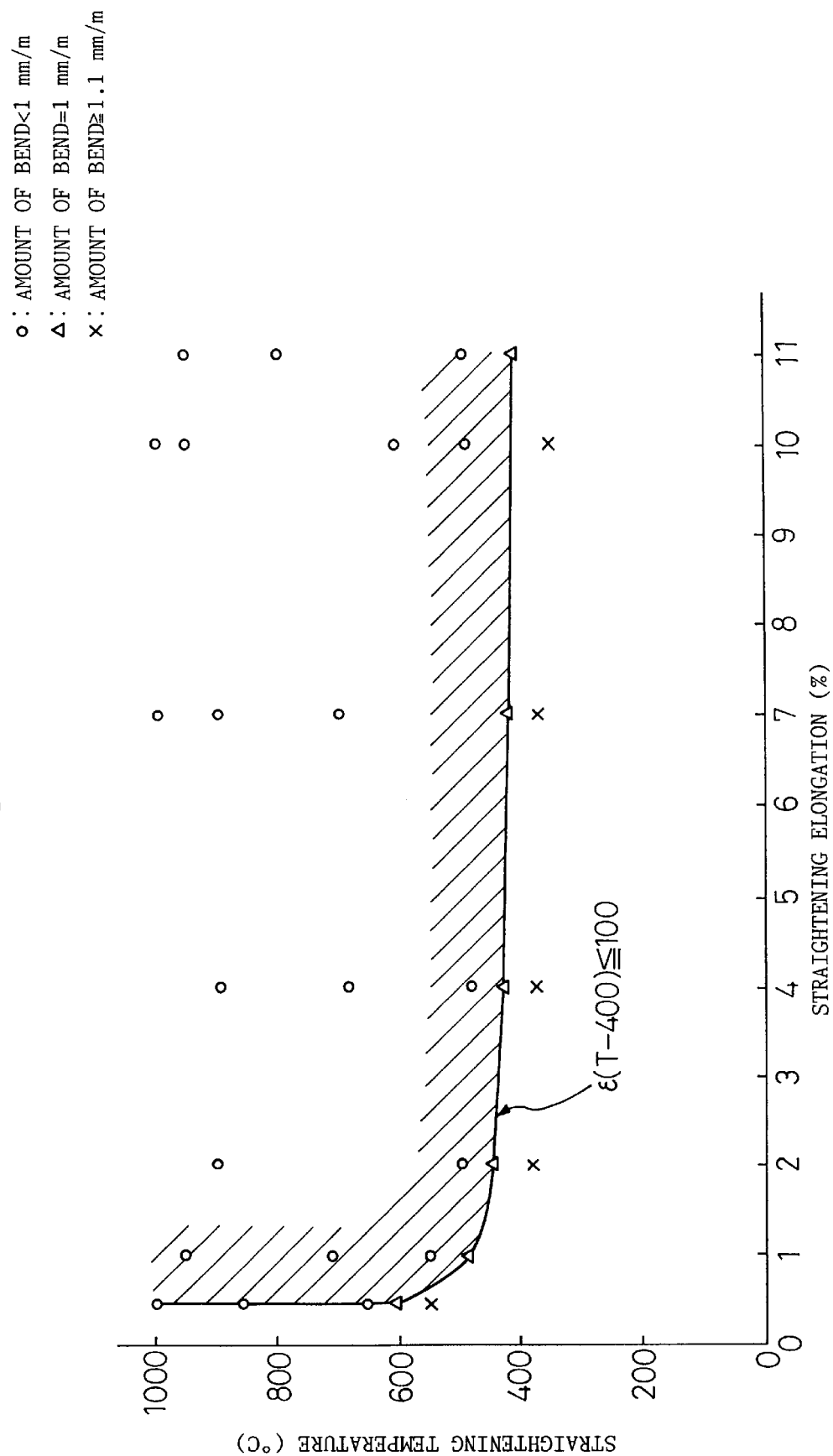
FIG. 4 is a view showing the influence of straightening temperature T and straightening elongation ε on an amount of bend of a pure titanium wire rod.
Figure 5:
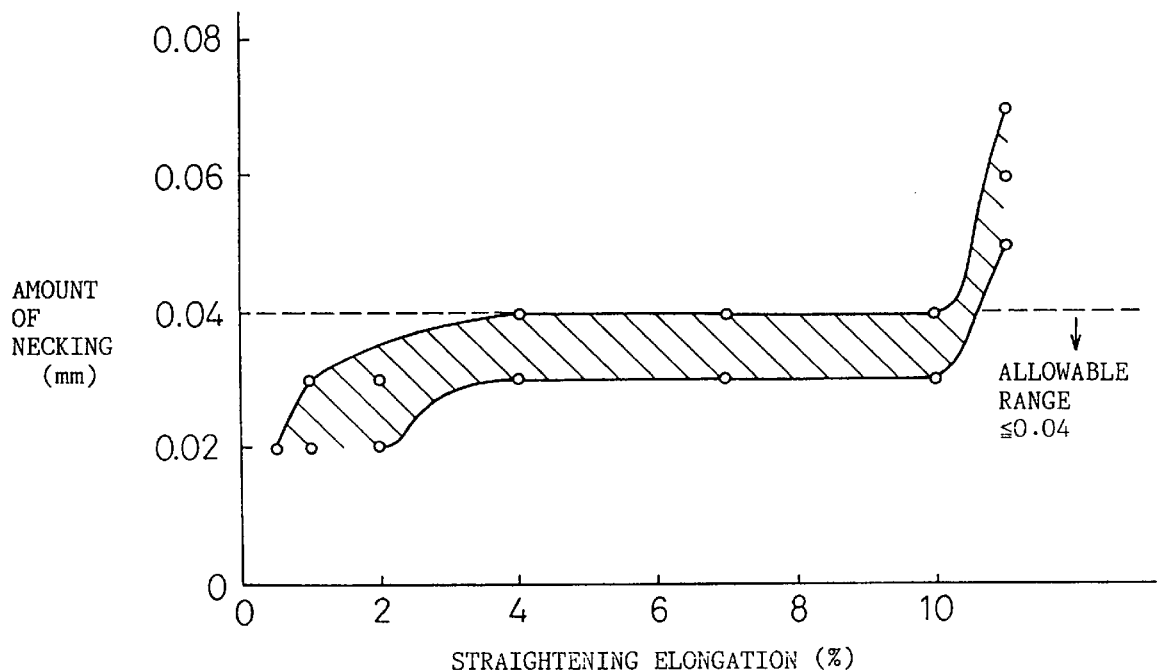
FIG. 5 is a view showing the influence of straightening elongation ε on amount of necking in a pure titanium wire rod.
Figure 6:
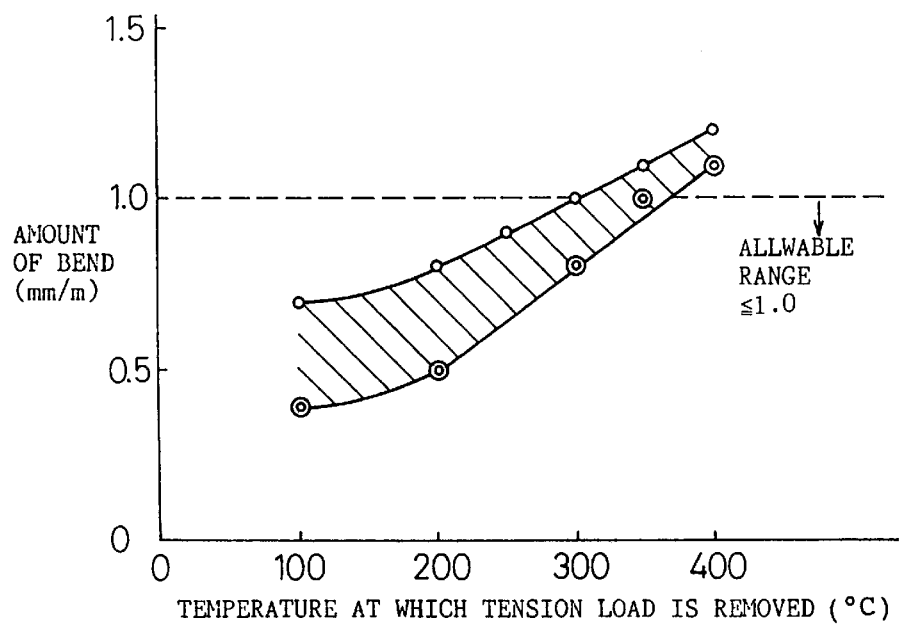
FIG. 6 is a view showing the influence of tensile-stress-removal temperature on amount of bend of a pure titanium wire rod.

Table 1 shows the straightening conditions and the results of the test. FIG. 4 shows the influence of the straightening temperature T and the straightening elongation ϵ on an amount of bend when the temperature at which tension was removed was set at at 100° C. FIG. 5 shows the influence of the straightening elongation ϵ on an amount of necking. FIG. 6 shows the influence of the temperature at which tension was removed in the cooling process, on an amount of bend under the condition that the straightening temperature T was 500° C., the straightening elongation ϵ was 2% (shown by mark ○ in the drawing), and the straightening elongation ϵ was 10% (shown by mark ○ in the drawing).

As can be seen in FIG. 4, a range of the straightening temperature T and that of the straightening elongation ϵ, by which an amount of bend can be reduced to a value not more 1 mm/m, are expressed by a hyperbola shown by the expression (1). In this connection, as can be seen in FIG. 4, the lower limit of the straightening elongation ϵ was 0.5%. As can be seen in FIG. 5, it was preferable that the upper limit of the straightening elongation ϵ was 10%, by which an amount of necking was suppressed to be a value not more than 0.04 mm.

When the straightening temperature T exceeded 900° C., the wire rods were remarkably oxidized. Therefore, even when an antioxidant was previously coated on the wire rods, an amount of scale generated by oxidation was increased, so that an amount of grinding was increased to 0.10 mm in the process of centerless grinding. Therefore, it was preferable that the straightening temperature T was not higher than 900° C., and also it was preferable that the lower limit of the straightening temperature T was 410° C. as can be seen in FIG. 4.

$$\epsilon(T-400) \geq 100 \tag{1}$$

T: straightening temperature (° C.)

ϵ: straightening elongation (%)

As can be seen in FIG. 6, in order to obtain an amount of bend of 1 mm/m, it was preferable that the temperature at which tension load was removed was not higher than 300° C.

In this connection, when the wire rods were previously subjected to rough-straightening by a common cold straightening roller unit so that an amount of bend could be reduced to 10 to 20 mm/m, it was possible to reduce an amount of bend to 0.9 mm/m by the straightening method of the present invention.

TABLE 1

| Material type | Straightening temperature T (° C.) | Straightening elongation ϵ (%) | ϵ (T-400) | Temperature at which tension load is removed (° C.) | Amount of bend (mm/m) | Amount of necking (mm) | Amount of centerless grinding (mm) | Remark |
|---|---|---|---|---|---|---|---|---|
| Second | 550 | 0.5 | 75* | 100 | 1.2* | 0.02 | Difficult to grind | Comparative example |
| type pure | 602 | 0.5 | 101 | 100 | 1.0 | 0.02 | 0.05 | Inventive example |
| titanium | 653 | 0.6 | 152 | 100 | 0.9 | 0.02 | 0.05 | Inventive example |
| | 850 | 0.7 | 315 | 100 | 0.4 | 0.02 | 0.05 | Inventive example |
| | 1000 | 0.5 | 300 | 100 | 0.4 | 0.02 | 0.10 | Inventive example |
| | 492 | 1.1 | 101 | 100 | 1.0 | 0.02 | 0.05 | Inventive example |
| | 553 | 1.1 | 168 | 100 | 0.6 | 0.02 | 0.05 | Inventive example |
| | 705 | 1.1 | 336 | 100 | 0.5 | 0.02 | 0.05 | Inventive example |
| | 945 | 0.9 | 491 | 100 | 0.3 | 0.02 | 0.10 | Inventive example |
| | 382 | 2.2 | −40 | 100 | 1.2* | 0.02 | Difficult to grind | Comparative example |
| | 450 | 2.0 | 100 | 100 | 1.0 | 0.03 | 0.05 | Inventive example |
| | 500 | 2.0 | 200 | 100 | 0.7 | 0.02 | 0.05 | Inventive example |
| | 900 | 2.1 | 1050 | 100 | 0.3 | 0.02 | 0.05 | Inventive example |
| | 380 | 4.0 | −80 | 100 | 1.2* | 0.03 | Difficult to grind | Comparative example |
| | 425 | 4.0 | 100 | 100 | 1.0 | 0.04 | 0.05 | Inventive example |
| | 468 | 4.0 | 272 | 100 | 0.5 | 0.03 | 0.05 | Inventive example |
| | 692 | 4.0 | 1168 | 100 | 0.3 | 0.03 | 0.05 | Inventive example |
| | 895 | 3.9 | 1931 | 100 | 0.3 | 0.04 | 0.05 | Inventive example |
| | 370 | 7.2 | −216 | 100 | 1.1* | 0.04 | Difficult to grind | Comparative example |
| | 415 | 7.0 | 105 | 100 | 1.0 | 0.04 | 0.05 | Inventive example |
| | 703 | 6.8 | 2060 | 100 | 0.3 | 0.03 | 0.05 | Inventive example |
| | 895 | 6.8 | 3366 | 100 | 0.3 | 0.04 | 0.05 | Inventive example |
| | 1000 | 6.9 | 4140 | 100 | 0.3 | 0.04 | 0.10 | Inventive example |
| | 350 | 10.0 | −500 | 100 | 1.2* | 0.03 | Difficult to grind | Comparative example |
| | 492 | 10.0 | 920 | 100 | 0.4 | 0.04 | 0.05 | Inventive example |
| | 604 | 9.9 | 2020 | 100 | 0.4 | 0.04 | 0.05 | Inventive example |

TABLE 1-continued

| Material type | Straightening temperature T (° C.) | Straightening elongation ε (%) | ε (T-400) | Temperature at which tension load is removed (° C.) | Amount of bend (mm/m) | Amount of necking (mm) | Amount of centerless grinding (mm) | Remark |
|---|---|---|---|---|---|---|---|---|
| | 946 | 9.5 | 5187 | 100 | 0.3 | 0.04 | 0.10 | Inventive example |
| Second | 1000 | 9.8 | 5880 | 100 | 0.3 | 0.04 | 0.10 | Inventive example |
| type pure | 410 | 11.0 | 110 | 100 | 1.0 | 0.05 | 0.10 | Inventive example |
| titanium | 504 | 10.9 | 1134 | 100 | 0.4 | 0.07 | 0.10 | Inventive example |
| | 800 | 10.8 | 4320 | 100 | 0.3 | 0.06 | 0.10 | Inventive example |
| | 955 | 11.0 | 6105 | 100 | 0.3 | 0.05 | 0.10 | Inventive example |
| | 492 | 2.1 | 193 | 200 | 0.8 | 0.02 | 0.05 | Inventive example |
| | 502 | 9.8 | 1000 | 200 | 0.5 | 0.02 | 0.05 | Inventive example |
| | 503 | 1.8 | 185 | 250 | 0.9 | 0.02 | 0.05 | Inventive example |
| | 508 | 10.0 | 1080 | 250 | 0.6 | 0.02 | 0.05 | Inventive example |
| | 498 | 2.2 | 216 | 300 | 1.0 | 0.03 | 0;0s | Inventive example |
| | 505 | 10.2 | 1071 | 300 | 0.8 | 0.03 | 0.05 | Inventive example |
| | 500 | 2.3 | 230 | 350* | 1.1* | 0.02 | Difficult to grind | Comparative example |
| | 506 | 9.6 | 1018 | 350* | 1.0 | 0.02 | Difficult to grind | Comparative example |
| | 495 | 2.4 | 228 | 400* | 1.2* | 0.02 | Difficult to grind | Comparative example |
| | 505 | 10.4 | 1092 | 400* | 1.1* | 0.03 | Difficult to grind | Comparative example |
| Wire rod | 502 | 1.0 | 102 | 100 | 0.8 | 0.02 | 0.05 | Inventive example |
| roughly straightened | 498 | 1.2 | 118 | 100 | 0.9 | 0.02 | 0.05 | Inventive example |
| Wire rod coated | 920 | 0.9 | 468 | 100 | 0.3 | 0.02 | 0.10 | Inventive example |
| with antioxidant | 950 | 0.8 | 440 | 100 | 0.3 | 0.02 | 0.10 | Inventive example |

(Remark) Mark * represents a value out of the range of the present invention.

Example 2

Wire rods made of titanium alloy of Ti-3Al-8V-6Cr-4Mo-4Zr, which were difficult to straighten, were subjected to straightening under the following conditions.

First, a billet was heated to a temperature of 1100° C. Then, the heated billet was rolled to a wire rod, the diameter of which was 9 mm, at a finishing temperature of 1000° C. The thus obtained wire rod was wound into a coil-shape, the diameter of which was 1.4 m.

This coil-shaped wire rod was subjected to cold drawing and shaving so as to finish the surface of the wire rod and at the same time the section of the wire rod was finished to an accurate circularity, the diameter of which was 7.5 mm.

The thus finished coil-shaped wire rod was cut to the length of 2.2 m and straightened in the atmosphere by a direct electrical heating type straightener shown in FIG. 1.

Temperature of the wire rod was measured by a thermocouple, and the wire rod was cooled by air cooling. The straightening temperature T was changed in a range from 450° C. to 700° C. and also in a range from 800° C. to 1100° C. at intervals of 50° C., that is, the straightening temperature T was changed in 13 stages. The straightening elongation ε was changed in 6 stages of 0.5, 1, 2, 5, 8 and 9%. The temperature at which tension load was removed was changed in 6 stages of 100, 200, 250, 300, 350 and 400° C. Under the above conditions, the wire rods were straightened, and straight rods, the length of which was 2200 mm, were provided.

Figure 7:
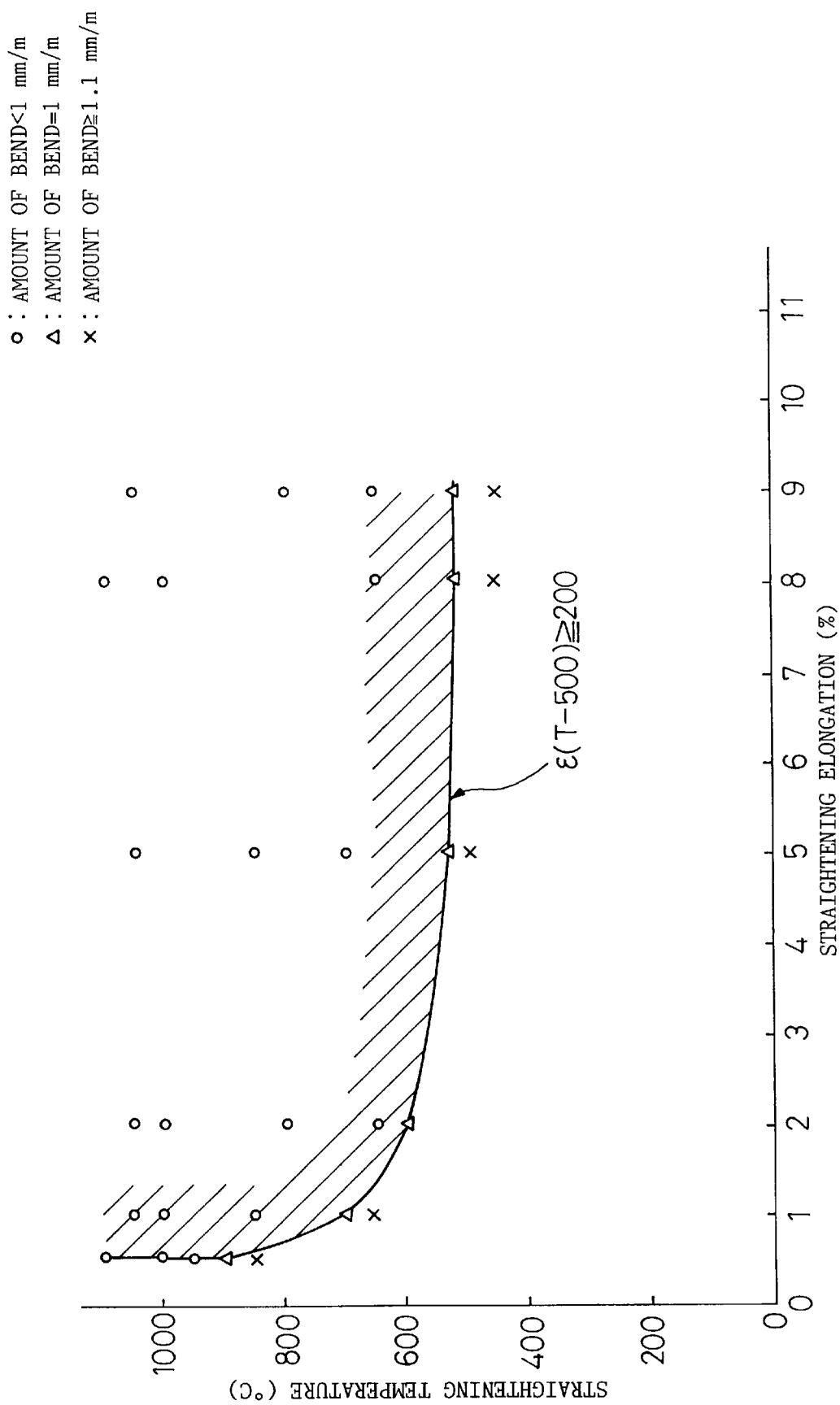
FIG. 7 is a view showing the influence of straightening temperature T and straightening elongation ε on an amount of bend of a titanium alloy wire rod of Ti-3Al-8V-6Cr-4Mo-4Zr.
Figure 8:
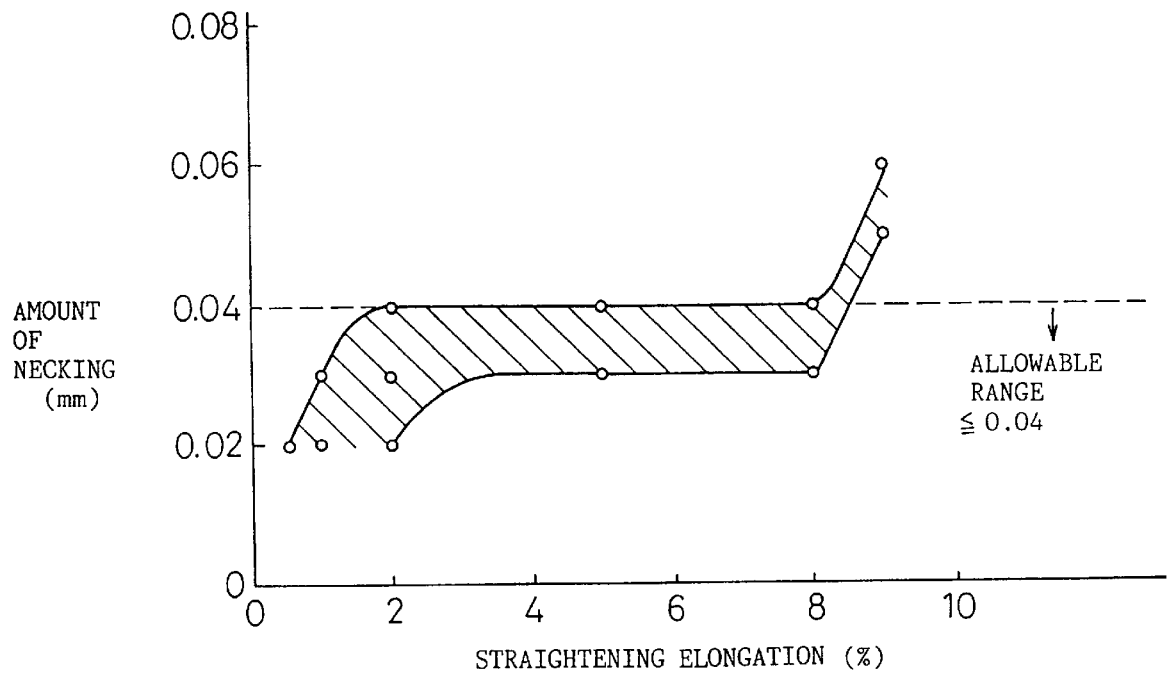
FIG. 8 is a view showing the influence of straightening elongation ε on amount of necking of a titanium alloy wire rod of Ti-3Al-8V-6Cr-4Mo-4Zr.
Figure 9:
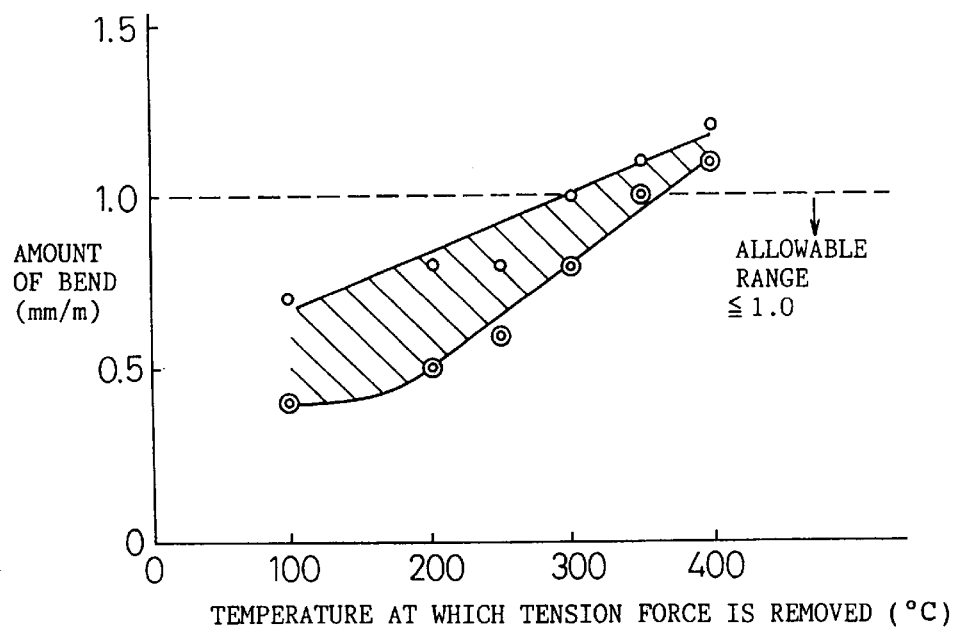
FIG. 9 is a view showing the influence of tensile-stress-removal temperature on amount of bend of a titanium alloy wire rod of Ti-3Al-8V-6Cr-4Mo-4Zr.

Table 2 shows the straightening conditions and the results of the test. FIG. 7 shows the influence of the straightening temperature T and the straightening elongation ε on an amount of bend when the temperature at which tension was removed was set at at 100° C. FIG. 8 shows the influence of the straightening elongation ε on an amount of necking. FIG. 9 shows the influence of the temperature at which tension was removed in the cooling process, on an amount of bend under the condition that the straightening temperature T was 650° C., the straightening elongation ε was 2% (shown by mark ○ in the drawing), and the straightening elongation ε was 8% (shown by mark ◉ in the drawing).

As can be seen in FIG. 7, a range of the straightening temperature T and that of the straightening elongation ε, by which an amount of bend can be reduced to a value not more than 1 mm/m, are expressed by a hyperbola shown by the expression (2). In this connection, as can be seen in FIG. 7, the lower limit of the straightening elongation ε was 0.5%. As can be seen in FIG. 8, it was preferable that the upper limit of the straightening elongation ε was 8%, by which an amount of necking was suppressed to be a value not more than 0.04 mm.

When the straightening temperature T exceeded 1000° C., the wire rods were remarkably oxidized. Therefore, even when an antioxidant was previously coated on the wire rods, the amount of scale generated by oxidation increased, so that the amount of grinding was increased to 0.10 mm in the process of centerless grinding. Therefore, it was preferable that the straightening temperature T was not higher than 1000° C., and that the lower limit of the straightening temperature T was 520° C.

$$\epsilon(T-500) \geq 200 \tag{2}$$

T: straightening temperature (° C.)

ε: straightening elongation (%)

As can be seen in FIG. 9, in order to obtain a ratio of bend of 1 mm/m, it was preferable that the temperature at which tension load was removed was not higher than 300° C.

Further, wire rods made of Ti-6Al-4V and Ti-3Al-2.5V were straightened under the same conditions as those described above, it was possible to obtain straight rods, and the oxidation scale on the surface could be removed by conducting centerless grinding while an amount of grinding was maintained at 0.05 mm.

TABLE 2

| Material type | Straightening temperature T (° C.) | Straightening elongation ϵ (%) | ϵ (T-500) | Temperature at which tension load is removed (° C.) | Amount of bend (mm/m) | Amount of necking (mm) | Amount of centerless grinding (mm) | Remark |
|---|---|---|---|---|---|---|---|---|
| Ti—3Al—8V—6Cr—4Mo—4Zr | 851 | 0.5 | 176* | 100 | 1.2 | 0.02 | Difficult to grind | Comparative example |
| | 900 | 0.5 | 200 | 100 | 1.0 | 0.02 | 0.05 | Inventive example |
| | 943 | 0.6 | 266 | 100 | 0.8 | 0.02 | 0.05 | Inventive example |
| | 1002 | 0.6 | 361 | 100 | 0.8 | 0.02 | 0.05 | Inventive example |
| | 1100 | 0.5 | 250 | 100 | 0.8 | 0.02 | 0.10 | Inventive example |
| | 648 | 0.9 | 133* | 100 | 1.3 | 0.03 | Difficult to grind | Comparative example |
| | 702 | 1.1 | 222 | 100 | 1.0 | 0.02 | 0.05 | Inventive example |
| | 852 | 0.9 | 317 | 100 | 0.8 | 0.03 | 0.05 | Inventive example |
| | 1000 | 1.1 | 550 | 100 | 0.6 | 0.02 | 0.05 | Inventive example |
| | 1048 | 0.9 | 493 | 100 | 0.4 | 0.02 | 0.10 | Inventive example |
| | 603 | 2.0 | 206 | 100 | 1.0 | 0.03 | 0.05 | Inventive example |
| | 652 | 1.8 | 274 | 100 | 0.7 | 0.02 | 0.05 | Inventive example |
| | 798 | 1.9 | 566 | 100 | 0.7 | 0.02 | 0.05 | Inventive example |
| | 998 | 2.1 | 1046 | 100 | 0.4 | 0.03 | 0.05 | Inventive example |
| | 1051 | 1.9 | 1047 | 100 | 0.3 | 0.02 | 0.05 | Inventive example |
| | 500 | 5.0 | 0* | 100 | 1.3 | 0.03 | Difficult to grind | Comparative example |
| | 541 | 5.1 | 209 | 100 | 1.0 | 0.03 | 0.05 | Inventive example |
| | 703 | 5.2 | 1056 | 100 | 0.7 | 0.04 | 0.05 | Inventive example |
| | 855 | 5.1 | 1811 | 100 | 0.6 | 0.03 | 0.05 | Inventive example |
| | 1048 | 4.8 | 2630 | 100 | 0.3 | 0.03 | 0.10 | Inventive example |
| | 450 | 7.8 | −390* | 100 | 1.3 | 0.04 | Difficult to grind | Comparative example |
| | 525 | 8.0 | 200 | 100 | 1.0 | 0.04 | 0.05 | Inventive example |
| | 651 | 7.8 | 1178 | 100 | 0.4 | 0.03 | 0.05 | Inventive example |
| | 990 | 8.0 | 3920 | 100 | 0.3 | 0.04 | 0.05 | Inventive example |
| | 1100* | 7.9 | 4740 | 100 | 0.3 | 0.04 | 0.10 | Inventive example |
| Ti—3Al—8V—6Cr—4Mo—4Zr | 454 | 8.8 | −405* | 100 | 1.2 | 0.05 | Difficult to grind | Comparative example |
| | 525 | 8.9 | 222 | 100 | 1.0 | 0.06 | 0.05 | Inventive example |
| | 651 | 9.0 | 1359 | 100 | 0.7 | 0.05 | 0.05 | Inventive example |
| | 799 | 8.8 | 2631 | 100 | 0.4 | 0.05 | 0.05 | Inventive example |
| | 1041* | 8.9 | 4815 | 100 | 0.3 | 0.06 | 0.10 | Inventive example |
| | 642 | 2.2 | 312 | 200 | 0.8 | 0.03 | 0.05 | Inventive example |
| | 655 | 7.8 | 1228 | 200 | 0.5 | 0.02 | 0.05 | Inventive example |
| | 645 | 2.1 | 305 | 250 | 0.8 | 0.03 | 0.05 | Inventive example |
| | 654 | 8.1 | 1247 | 250 | 0.6 | 0.04 | 0.05 | Inventive example |
| | 644 | 2.0 | 288 | 300 | 1.0 | 0.03 | 0.05 | Inventive example |
| | 653 | 7.9 | 1208 | 300 | 0.8 | 0.03 | 0.05 | Inventive example |
| | 655 | 2.0 | 310 | 350* | 1.1 | 0.04 | Difficult to grind | Comparative example |
| | 658 | 8.3 | 1311 | 350* | 1.0 | 0.03 | Difficult to grind | Comparative example |
| | 648 | 2.1 | 311 | 400* | 1.2 | 0.04 | Difficult to grind | Comparative example |
| | 650 | 8.1 | 1215 | 400* | 1.1 | 0.03 | Difficult to grind | Comparative example |
| Wire rod coated with anitoxidant | 1020 | 0.9 | 468 | 100 | 0.5 | 0.02 | 0.10 | Inventive example |
| | 1050 | 0.8 | 440 | 100 | 0.4 | 0.02 | 0.10 | Inventive example |
| Ti—6Al—4V | 595 | 2.2 | 209 | 100 | 0.8 | 0.03 | 0.05 | Inventive example |
| | 605 | 2.1 | 221 | 100 | 0.9 | 0.04 | 0.05 | Inventive example |
| Ti—3Al—2.5V | 605 | 1.9 | 201 | 100 | 0.7 | 0.04 | 0.05 | Inventive example |
| | 600 | 2.2 | 220 | 100 | 0.8 | 0.03 | 0.05 | Inventive example |

(Remark) Mark * represents a value out of the range of the present invention.

Example 3

Wire rods made of titanium alloy of Ti-3Al-8V-6Cr-4Mo-4Zr, which were difficult to straighten, were subjected to straightening by the following two methods. One is a method in which a conventional rotary housing type wire straightener is used, and the other is the method of the present invention. Comparison is made between the above two methods.

First, a billet was heated to a temperature of 1100° C. Then, the heated billet was rolled to a wire rod, the diameter of which was 9 mm, at a finishing temperature of 1000° C. The thus obtained wire rod was wound into a coil-shape, the diameter of which was 1.4 m.

This coil-shaped wire rod was subjected to cold drawing and shaving so as to finish the surface of the wire rod and at the same time the section of the wire rod was finished to an accurate circularity, the diameter of which was 7.5 mm.

First, the wire rod was straightened by the rotary housing type wire straightener of the conventional method.

By the rotary housing type wire straightener, the wire rod can be straightened when it is drawn in a rotary straightening tool. In the rotary housing type wire straightener, dies and other tools, which are displaced in the wire rod proceeding direction, are used so that an amount of bending deformation can be adjusted.

The aforementioned finished coil-shaped wire rod was made to pass through this rotary housing type wire straightener, so that the wire rod was straightened and cut. In this way, 50 straight rods, the length of which was 2200 mm, were produced.

In the 50 straight rods produced in the above process, there were 40 straight rods, the amount of bend of which was not less than 1.1 mm/m, so that they could not be subjected to centerless grinding.

When the residual 10 straight rods were ground by a grinding amount of 0.05 mm, cracks and flaws were left in all straight rods after the completion of grinding. Accordingly, an additional grinding operation was conducted on 10 straight rods. As a result of the additional grinding, two straight rods having no cracks and flaws were obtained.

The result is shown in Table 3. A ratio of the number of good straight rods to the number of straight rods that had already been straightened was 0% when the amount of grinding was 0.05 mm, and the ratio was 4% when the amount of grinding was 0.10 mm. As described above, when the conventional method was used, the yield was lowered and the cost was raised.

Next, the wire rods were straightened by the method of the present invention.

The thus finished coil-shaped wire rod, the diameter of which was 7.5 mm, was cut to the length of 2.2 m and straightened in the atmosphere by a direct electrical heating type straightener shown in FIG. 1.

The straightening temperature T was 850° C., the straightening elongation ε was 2%, and the temperature at which tension load was removed was 100° C. Cooling was conducted by means of air cooling. Under the above conditions, 100 straight rods were produced, the length of which was 2200 mm.

In the above production test, there were no straight rods, the amount of bend of which was not less than 1.1 mm, on which it was difficult to conduct centerless grinding. Successively, all straight rods were ground by a grinding amount of 0.05 mm.

Two straight rods in which flaws were left were additionally ground so as to remove the flaws. As a result, all flaws were removed by the additional grinding. The result is shown on the third table.

By the method of the present invention, it was possible to stably provide highly accurate products having no flaws. Accordingly, it was possible to enhance the yield and produce straight rods of titanium alloy at low cost.

TABLE 3

| Method of straightening | Number of produced wire rods | Percent defective of bend Amount of bend ≧1.0 mm/m | Ratio of residual cracks and flaws after centerless grinding Amount of grinding 0.05 mm | Amount of grinding 0.1 mm | Through-yield Ratio of accepted products Amount of grinding 0.05 mm | Amount of grinding 0.1 mm |
|---|---|---|---|---|---|---|
| Conventional method | 50 | 80% | 100% | 80% | 0% | 4% |
| Method of the invention | 100 | 0% | 2% | 0% | 98% | 100% |

Example 4

Titanium alloy of Ti-6Al-4V was used and engine valves were produced under the following conditions.

A billet made of the above titanium alloy was heated and rolled at a temperature in the β phase temperature region. Under the above condition, the billet was rolled to a wire rod, the diameter of which was 9 mm. Thus rolled wire rod was wound and formed into a coil-shaped wire rod, and the diameter of the coil was approximately 1 m. The microstructure of this material was a needle-shaped α crystal structure.

This coil-shaped wire rod was subjected to cold drawing and shaving so as to finish the surface of the wire rod and at the same time the section of the wire rod was finished to an accurate circularity, the diameter of which was 7 mm. This coil-shaped wire rod was roughly straightened by the conventional straightening rollers arranged in a zigzag manner, so that an amount of bend of the wire rod after straightening was suppressed to a value not more than 20 mm/m. The thus obtained coil-shaped wire rod was cut to a length of 2.2 m. Then the wire rod was hot-straightened by a direct electrical heating type straightening apparatus illustrated in FIG. 1 in the atmosphere. In this case, the straightening temperature was set at a value in the range from 600 to 1000° C., and the straightening elongation was set at 5%, and hot-straightening was conducted in accordance with the above expression (2). The thus obtained straight bars were subjected to centerless grinding and straightened into completely straight rods, the diameter of which was 6.7 mm. Further, according to a predetermined method, an umbrella portion of the valve was forged, so that the valve was roughly formed, wherein the umbrella diameter was 36 mm and the valve length was 115 mm. The roughly formed valve was annealed for 1 hour at a temperature in the range from 600 to 1000° C. in a state of a roughly formed engine valve that was laid down on its side as illustrated in FIG. 10(B).

After the completion of the above processes, an amount of bend generated in the shaft portion 11 of the roughly formed valve was measured, that is, a necessary amount of centerless grinding on one side of the roughly formed valve was measured. The results of measurement are shown in Table 4.

TABLE 4

| Straightening temperature (° C.) | Annealing temperature (° C.) | | | | | | Remark |
|---|---|---|---|---|---|---|---|
| | 600 | 700 | 750 | 800 | 850 | 900 | |
| | Amount of bend in the shaft portion of the roughly formed valve (μm) | | | | | | |
| 600 | 0 | 44 | 49 | 50 | 57 | 70 | Comparative example |
| 700 | 0 | 0 | 5 | 6 | 13 | 26 | Inventive example |
| 750 | 0 | 0 | 0 | 1 | 8 | 21 | Inventive example |
| 800 | 0 | 0 | 0 | 0 | 7 | 20 | Inventive example |
| 850 | 0 | 0 | 0 | 0 | 7 | 20 | Inventive example |
| 900 | 0 | 0 | 0 | 0 | 7 | 20 | Inventive example |
| 1000 | 0 | 0 | 0 | 0 | 7 | 20 | Inventive example |

A method of measuring the bend of the shaft portion is described as follows. Both ends of the shaft portion were supported, and the valve was turned. Then the deviation at the center of the straight rod was measured by a dial gauge, so that the maximum and the minimum of deviation were found, and then a half of the difference between the maximum and the minimum was calculated, which was defined as the bend of the shaft portion.

Figure 10C:
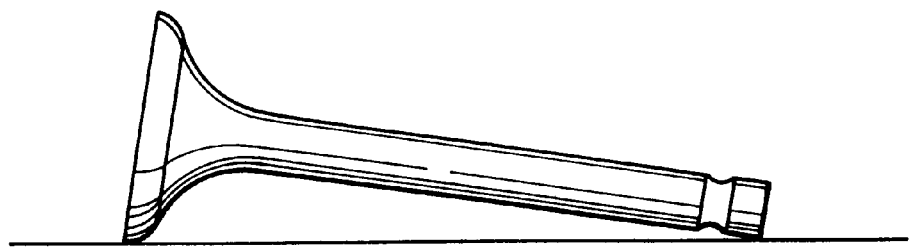
FIG. 10(C) is a view showing a state of an engine valve laid down on its side.
Figure 10D:
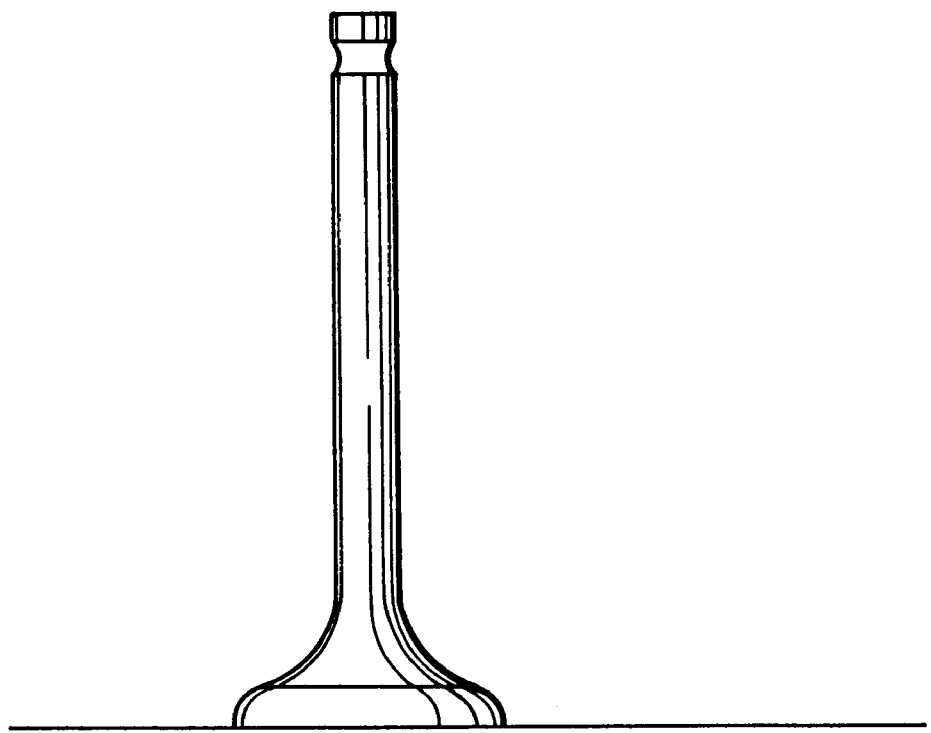
FIG. 10(D) is a view showing a state of an engine valve standing by itself.
Figure 11:
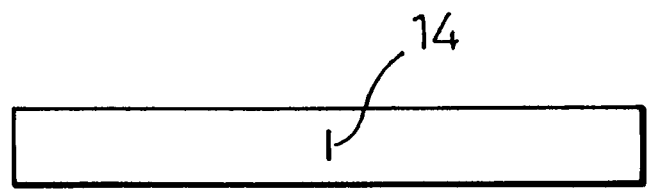
FIG. 11 is a schematic illustration of a flaw occured in the C-direction in engine valve material.

Due to the foregoing, when the wire rods were straightened at a temperature not lower than 700° C. while the straightening elongation was maintained at 5%, an amount of bend corresponding to 94% generated in the later heating process could be removed. Accordingly, it was possible to greatly reduce a necessary amount of centerless grinding in the valve machining process. On the other hand, when straightening was conducted at a temperature of 600° C., only an amount of bend corresponding to 50% was removed. In this connection, in the annealing process conducted at a temperature in the range from 850 to 1000° C., a small amount of deformation was caused by creep. Next, the roughly made valve was finished to a final valve shape in which he umbrella diameter was 35 mm, the valve length was 110 mm and the shaft diameter was 6.68 mm. Then, while the valve was laid down on its side (shown in FIG. 10(C)) and also while the valve was made to stand on itself (shown in FIG. 10(D)), the valve was subjected to oxidation processing at a temperature in the range from 700 to 1000° C. for one hour. The results are shown in Table 5. The titanium alloy straight rod produced by the method of the present invention was advantageous in that an amount of bend in the shaft portion was small in the annealing process conducted after forging the umbrella portion. Accordingly, a necessary amount of centerless grinding was very small in the process of machining the valve. Therefore, when an appropriate temperature was selected so that oxidation processing could be appropriately performed and when an appropriate valve installing condition was selected, it was possible to produce a valve, the dimensional accuracy of which was high. In this case, the dimensional accuracy required for the valve is not higher than 10 μm. In the case of a valve, the amount of bend is small after annealing, since at least the shaft portion has already been annealed in the hot-straightening process, and the annealing process can be omitted as long as the umbrella portion is forged at a high temperature so that strain can not remain in the valve. In other words, it is possible to directly conduct an oxidation processing after forging and finish-machining.

was 7.9 mm. A portion of the wire rod was subjected to continuous drawing and straightening and formed into a straight rod, the diameter of which was 7.6 mm. Then the straight rod was straightened by a two roller type cold straightener while an amount of roller offset was maintained at 10 mm. Since the straight rod was processed in this way, bends in the straight rod were completely removed. After the straight rod was subjected to centerless grinding in which it was processed to a cold-finished straight rod, the diameter of which was 7.3 mm, the cold-finished straight rod underwent a penetrant inspection test. In the test, flaws in the direction of C illustrated in FIG. 11, the length of which was 1 to 3 mm, were found on the straight rod, wherein the percent defective of flaws in the direction C was 30% in the above test. Then the straight rod was straightened while an amount of roller offset was maintained at 7 mm. After the completion of straightening the rod, the percent defective of bends was 10%, and the percent defective of flaws in the direction of C was 15%. When the straight rod was straightened while an amount of roller offset was maintained at 5 mm, the percent defective of bends was 20%, and the percent defective of flaws in the direction of C was 10%. The results are shown in Table 6. In this case, the defective product was defined as a straight rod, the bend of which was larger than 0.25 mm per 1 m of the straight rod.

TABLE 5

| Straightening temperature (° C.) | Annealing temperature (° C.) | How to put a valve in the oxidation processing | Necessary amount of centerless grinding on one side (μm) | Oxidation processing temperature (° C.) | | | | | Remark |
|---|---|---|---|---|---|---|---|---|---|
| | | | | 700 | 750 | 800 | 850 | 900 | |
| | | | | Amount of bend of a valve shaft generated after oxidation processing (μm) | | | | | |
| 200 | 800 | Laid on its side | 100 | 0 | 0 | 0 | 7 | 20 | Comparative example |
| | | Stand by itself | 100 | 0 | 0 | 0 | 0 | 0 | Comparative example |
| 700 | 800 | Laid on its side | 6 | 0 | 0 | 0 | 7 | 20 | Inventive example |
| | | Stand by itself | 6 | 0 | 0 | 0 | 0 | 0 | Inventive example |
| 700 | 700 | Laid on its side | 0 | 0 | 5 | 6 | 13 | 26 | Inventive example |
| | | Stand by itself | 0 | 0 | 5 | 6 | 6 | 6 | Inventive example |
| 900 | 800 | Laid on its side | 0 | 0 | 0 | 0 | 7 | 20 | Inventive example |
| | | Stand by itself | 0 | 0 | 0 | 0 | 0 | 0 | Inventive example |
| 1000 | 800 | Laid on its side | 0 | 0 | 0 | 0 | 7 | 20 | Inventive example |
| | | Stand by itself | 0 | 0 | 0 | 0 | 0 | 0 | Inventive example |

Example 5

A billet made of titanium alloy of Ti-6Al-4V was heated and hot-rolled at a temperature in the β phase temperature region. Under the above condition, the billet was rolled to a wire rod, the diameter of which was 9 mm. The rolled wire rod was wound and formed into a coil-shape, and the diameter of the coil was approximately 1 m. The microstructure of this material was a needle-shaped a crystal structure.

Figure 12:
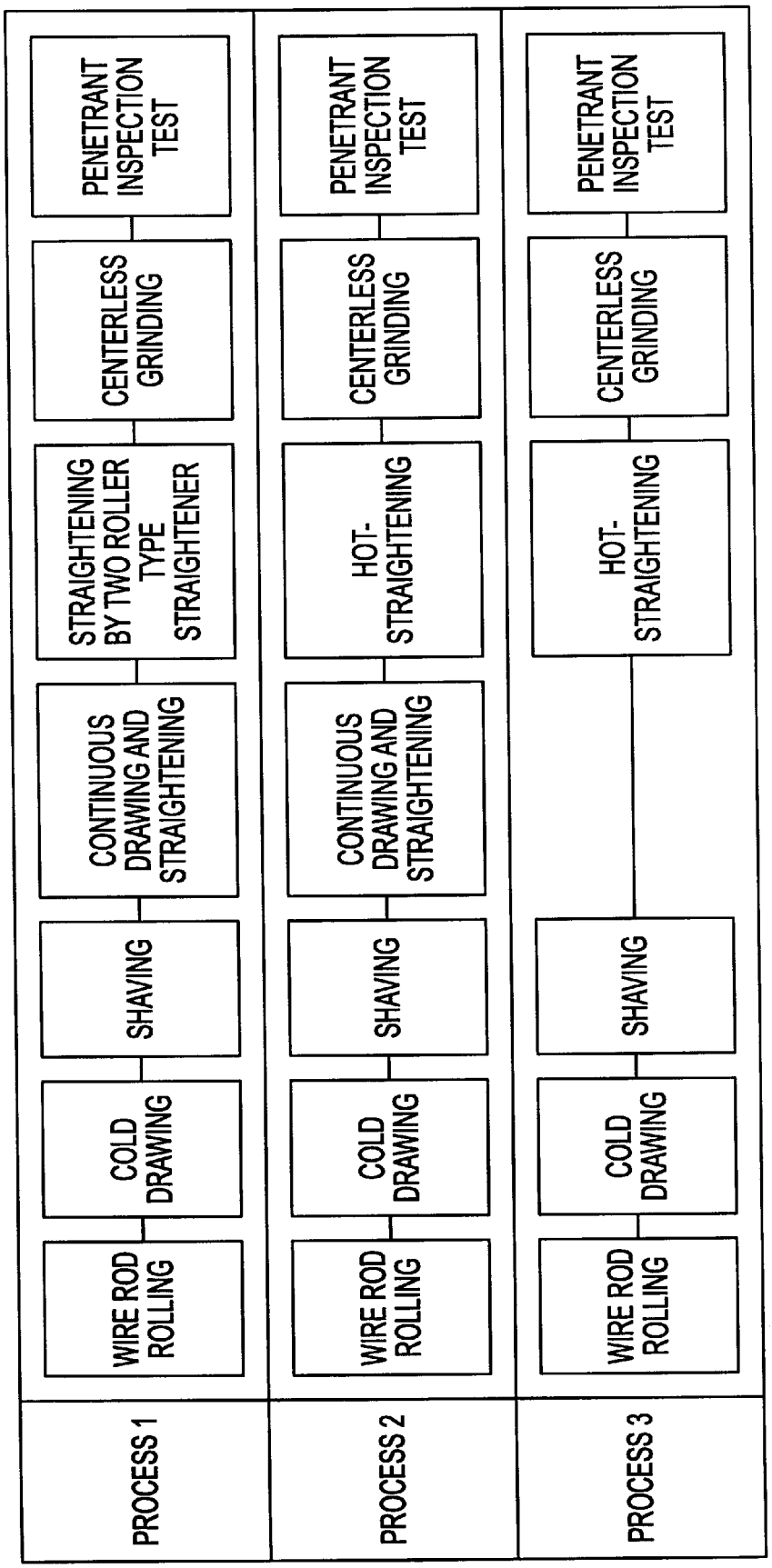
FIG. 12 is a flow chart showing Processes 1, 2 and 3.

As shown in Process 1 shown in FIG. 12, this coil-shaped wire rod was subjected to cold drawing and shaving so as to remove flaws on the surface of the wire rod and form the section into an accurate circularity, the diameter of which

TABLE 6

| Process No. | Number of pieces | Amount of offset of two rollers | Percent defective of bends | Percent defective of flaws in the direction c | Total percent defective |
|---|---|---|---|---|---|
| Process 1 | 40 | 10 mm | 0 (0%) | 12 (30%) | 30% |
| | 40 | 7 mm | 4 (10%) | 6 (15%) | 25% |
| | 40 | 5 mm | 8 (20%) | 4 (10%) | 30% |

Process 2 was performed as follows. An accurately circular straight rod, the diameter of which was 7.9 mm, was subjected to continuous drawing and straightening and formed into a straight rod, the diameter of which was 7.6 mm. Thus obtained straight rod was hot-straightened in such a manner that the straight rod was stretched at an elongation rate of 1.0% while it was electrically heated to a temperature in the range from 700 to 1000° C. After the bend in the straight rod had been removed in the above hot-straightening process, it was subjected to centerless grinding and made into a cold-finished rod, the diameter of which was 7.3 mm. The thus obtained cold-finished rod underwent a penetrant inspection test. As a result of the test, no flaws were found on the surface of the straight rod.

Process 3 was performed as follows. The above wire rod was subjected to cold drawing and shaving so that it was made into an accurately circular rod, the diameter of which was 7.6 mm. Thus obtained wire rod was hot-straightened in such a manner that the wire rod was stretched at an elongation rate of 1.0% while it was electrically heated to a temperature in the range from 700 to 1000° C. In this way, the wire rod was made into a straight rod having no bent portions. After that, the straight rod was subjected to centerless grinding and made into a cold-finished rod, the diameter of which was 7.3 mm. This cold-finished rod underwent a penetrant inspection test. As a result of the test, no flaws were found on the surface of the cold-finished rod.

The results of the penetrant inspection test are shown in Table 7.

TABLE 7

| Process No. | Number of pieces | Hot-straightening temperature | Percent defective of bends | Percent defective of flaws in the direction c | Total percent defective |
|---|---|---|---|---|---|
| Process 2 | 20 | 700° C. | 0 (0%) | 0 (0%) | 0% |
| | 20 | 800° C. | 0 (0%) | 0 (0%) | 0% |
| | 20 | 1000° C. | 0 (0%) | 0 (0%) | 0% |
| Process 3 | 20 | 700° C. | 0 (0%) | 0 (0%) | 0% |
| | 20 | 800° C. | 0 (0%) | 0 (0%) | 0% |
| | 20 | 1000° C. | 0 (0%) | 0 (0%) | 0% |

When hot-straightening was performed as described above, it was possible to produce straight rods having no flaws on the surfaces at a high yield.

Example 6

There were prepared coil-shaped wire rods made of titanium alloys. In this case, titanium alloys used in this example were: Ti-6Al-4V having an equi-axed α crystal structure, the grain size of which was 4 μm; Ti-3Al-2.5V having an equi-axed α crystal structure, the grain size of which was 4 μm; Ti-6Al-4V having a needle-shaped α crystal structure, the width of which was 2 to 4 μm; Ti-3Al-2.5V having a needle-shaped α crystal structure, the width of which was 2 to 4 μm; Ti-6Al-2Fe-0.1Si; Ti-5Al-1Fe; Ti-5Al-2Cr-1Fe; Ti-6Al-2Sn-4Zr-6Mo; and Ti-6Al-2Sn-4Zr-2Mo-0.1Si.

The method of the present invention was applied to the coil-shaped wire rods made of the above titanium alloys. For example, concerning the coil-shaped wire rods made of titanium alloy having an equi-axed α crystal structure, the grain size of which was 2 to 4 μm, in order to change the microstructure before the coil-shaped wire rod was hot-straightened, it was electrically heated by the hot straightening apparatus and cooled to the straightening temperature by air cooling. After the coil-shaped wire rod had been cooled, it was straightened. The thus obtained wire rod was subjected to centerless grinding and processed to make a valve. That is, the wire rod was subjected to forging to form an umbrella portion, annealing, finishing and oxidation processing.

Table 8 shows the detail of each process and the bend of the shaft portion after each process was completed.

After the umbrella portion had been forged, annealing was conducted in such a manner that the roughly formed valve was laid down on its side and heated in an atmospheric furnace for one hour. Concerning the oxidation processing, the roughly formed valve was made to stand by itself and heated in an atmospheric furnace.

According to the method of the present invention, an amount of bend of the shaft portion was not more than 13 μm, that is, an amount of bend of the shaft portion was very small. Therefore, it was possible to reduce the necessary amount of grinding.

TABLE 8

| | | Straightening process | | Annealing temperature | Amount of bend | Temperature of oxidation | Amount of bend of a shaft | |
|---|---|---|---|---|---|---|---|---|
| Titanium alloy | Microstructure | Structure conditioning temperature ° C. | Straightening temperature ° C. | after forging an umbrella portion ° C. | of a shaft portion after annealing μm | processing after finishing ° C. | portion after oxidation processing μm | Remark |
| Ti—6Al—4V | Equi-axed structure of which the grain size is 2 to 4 μm | 1100 | 850 | 850 | 7 | 850 | 0 | Inventive example |
| Ti—6Al—4V | Equi-axed structure of which the grain size is 2 to 4 μm | 980 | 800 | 800 | 10 | 800 | 0 | Inventive example |
| Ti—6Al—4V | Equi-axed structure of which the grain size is 2 to 4 μm | 950 | 700 | 750 | 10 | 750 | 0 | Inventive example |
| Ti—6Al—4V | Needle-shaped structure of which the width is 2 to 4 μm | — | 700 | 850 | 13 | 850 | 0 | Inventive example |
| Ti—6Al—4V | Needle-shaped structure of which the width is 2 to 4 μm | — | 850 | 850 | 7 | 850 | 0 | Inventive example |
| Ti—3Al—2.5V | Equi-axed structure of which the grain size is 2 to 4 μm | 1000 | 800 | 850 | 5 | 850 | 0 | Inventive example |
| Ti—3Al—2.5V | Needle-shaped structure of | — | 800 | 850 | 5 | 850 | 0 | Inventive |

TABLE 8-continued

| Titanium alloy | Microstructure | Straightening process Structure conditioning temperature °C. | Straightening temperature °C. | Annealing temperature after forging an umbrella portion °C. | Amount of bend of a shaft portion after annealing μm | Temperature of oxidation processing after finishing °C. | Amount of bend of a shaft portion after oxidation processing μm | Remark |
|---|---|---|---|---|---|---|---|---|
| | which the width is 2 to 4 μm | | | | | | | example |
| Ti—6Al—2Fe—0.1Sl | Needle-shaped structure of which the width is 2 to 4 μm | — | " | " | " | " | " | Inventive example |
| Ti—5Al—1Fe | Needle-shaped stucture of which the width is 2 to 4 μm | — | " | " | " | " | " | Inventive example |
| Ti—5Al—2Cr—1Fe | Needle-shaped structure of which the width is 2 to 4 μm | — | " | " | " | " | " | Inventive example |
| Ti—6Al—2Sn—4Zr—6Mo | Needle-shaped structure of which the width is 2 to 4 μm | — | " | " | " | " | " | Inventive example |
| Ti—6Al—2Sn—4Zr—2Mo—0.1Si | Needle-shaped structure of which the width is 2 to 4 μm | - | " | " | " | " | " | Inventive example |
| Ti—6Al—4V | Equi-axed structure of which the grain size is 2 to 4 μm | — | Room temperature | 650 | 70 | 850 | 80 | Comparative example |
| Ti—3Al—2.5V | Equi-axed structure of which the grain size is 2 to 4 μm | — | Room temperature | 800 | 200 | 850 | 50 | Comparative example |

Table 9 shows a comparison between the production cost of an engine valve produced by the method of the present invention and the production cost of an engine valve produced by the conventional method. As can be seen on the tenth table, it is possible to greatly reduce the production cost of an engine valve by the method of the present invention.

TABLE 9

| | Rod diameter mm | Valve diameter mm | Material cost | Amount of cutting |
|---|---|---|---|---|
| Conventional method | 7.0 | 6.68 | 100% | 100% |
| Method of the present invention | 6.7 | 6.68 | 91.6% | 6.3 |

In the above examples, the present invention was applied to a method of producing engine valves. However, it should be noted that the present invention is not limited to the specific examples. The method of the present invention may be applied to a case in which other automobile parts or tools are produced.

INDUSTRIAL APPLICABILITY

When straight rods of titanium or titanium alloy are hot-straightened to obtain straight rods by the method of the present invention, it is possible to obtain straight rods in which the occurrence of cracks and flaws can be reduced and the dimensional accuracy is stably high. Therefore, it is possible to produce straight rods of titanium or titanium alloy at a high yield and low production cost. Especially when the method of the present invention is applied to the production of material of automobile parts such as engine valves, an amount of bend caused in the shaft portion of the valve after the completion of forging can be greatly reduced. Therefore, it is possible to reduce an amount of cutting of the shaft portion, and the production cost can be reduced.

We claim:

1. A method of straightening a titanium or titanium alloy wire rod for an engine valve comprising the steps of:

providing a titanium or titanium alloy billet, where the titanium ally is selected from the group consisting of β, α+β or near α titanium alloy;

hot rolling a titanium billet into a wire rod;

winding the hot rolled wire rod into a coil;

cold drawing the wire rod;

cutting the wire rod to a predetermined length to obtain a bent wire rod;

heating the bent wire rod to a straightening temperature T while both end portions of the wire rod are fixed to a holding device of a hot straightener and tension is given to the wire rod;

applying a predetermined straightening elongation ε to the wire rod at the straightening temperature;

maintaining heat at the straightening temperature T for a predetermined period of time;

hot-straightening the wire rod under the condition that the straightening temperature T and straightening elongation ε satisfy the following expression (1)

$$\epsilon(T-400) \geq 100 \qquad (1)$$

ceasing heating of the wire rod when a predetermined straightening elongation is applied to the wire rod; and cooling the wire rod while a tension is applied to the wire rod upon cessation of heating, thereby forming a straight titanium wire rod having less than 1 mm/m bending.

2. A method of straightening a wire rod of titanium according to claim 1, wherein the straightening temperature is in a range from 410 to 900° C., and the straightening elongation is in a range from 0.5 to 10%.

3. A method of straightening a titanium or titanium alloy wire rod for an engine valve comprising the steps of:

providing a titanium or titanium alloy billet, where the titanium alloy is selected from the group consisting of β, α+β or near α titanium alloy;

hot rolling a titanium billet into a wire rod;

winding the hot rolled wire rod into a coil;

cold drawing the wire rod;

cutting the wire rod to a predetermined length to obtain a bent wire rod;

heating the bent wire rod to a straightening temperature T while both end portions of the wire rod are fixed to a holding device of a hot straightener and tension is given to the wire rod;

applying a predetermined straightening elongation $\epsilon$ to the wire rod at the straightening temperature;

maintaining heat at the straightening temperature T for a predetermined period of time;

hot-straightening the wire rod under the condition that the straightening temperature T and straightening elongation $\epsilon$ satisfy the following expression (1)

$$\epsilon(T-500) \geq 200 \tag{1}$$

ceasing heating of the wire rod when a predetermined straightening elongation is applied to the wire rod; and cooling the wire rod while a tension is applied to the wire rod upon cessation of heating, thereby forming a straight titanium wire rod having less than 1 mm/m bending.

4. A method of straightening a wire rod of titanium alloy according to claim 3, wherein the straightening temperature is in a range from 520 to 1100° C., and the straightening elongation is in a range from 0.5 to 8%.

* * * * *